US012807190B2

(12) United States Patent
Li et al.

(10) Patent No.: US 12,807,190 B2
(45) Date of Patent: Nov. 24, 2026

(54) TECHNIQUES FOR CONTROLLING VEHICLES WITHOUT OVER-RELIANCE ON VEHICLE STATUS INFORMATION

(71) Applicant: NVIDIA CORPORATION, Santa Clara, CA (US)

(72) Inventors: Zhiqi Li, Shanghai (CN); Zhiding Yu, Santa Clara, CA (US); Shiyi Lan, San Jose, CA (US); Jan Kautz, Lexington, MA (US); Jose Manuel Alvarez Lopez, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 191 days.

(21) Appl. No.: 18/929,214

(22) Filed: Oct. 28, 2024

(65) Prior Publication Data

US 2025/0171051 A1 May 29, 2025

Related U.S. Application Data

(60) Provisional application No. 63/603,597, filed on Nov. 28, 2023.

(51) Int. Cl.
*B60W 60/00* (2020.01)
*B60W 30/095* (2012.01)
(Continued)

(52) U.S. Cl.
CPC .... *B60W 60/0027* (2020.02); *B60W 30/0953* (2013.01); *B60W 30/0956* (2013.01);
(Continued)

(58) Field of Classification Search
CPC ......... B60W 60/0027; B60W 30/0953; B60W 30/0956; B60W 50/06; B60W 50/14; B60W 60/0015; B60W 2050/0014; B60W 2050/146; B60W 2554/4045; B60W 2050/0088; B60W 30/095; B60W 30/18159; G06N 3/044; G06N 3/0464; G06N 3/047; G06N 3/096; G06N 20/00; G06N 3/045; G06N 3/08; G06N 3/084; G06N 5/01; G06N 20/10; G06N 20/20; G06V 10/82; G06V 20/56
See application file for complete search history.

(56) References Cited

U.S. PATENT DOCUMENTS

2025/0091605 A1* 3/2025 Luo ........................ G01C 21/30

OTHER PUBLICATIONS

Bojarski et al., "End to End Learning for Self-Driving Cars", arXiv:1604.07316v1, Apr. 25, 2016, pp. 1-9.
(Continued)

*Primary Examiner* — Donald J Wallace
(74) *Attorney, Agent, or Firm* — Artegis Law Group, LLP

(57) ABSTRACT

One embodiment of a method for controlling a vehicle includes processing sensor data associated with a vehicle using a first trained machine learning model to generate one or more bird's eye view (BEV) features, performing one or more cross-attention operations based on the one or more BEV features and a learned embedding to generate an updated embedding, processing the updated embedding using a second trained machine learning model to generate one or more trajectories, and performing one or more operations to control the vehicle based on the one or more trajectories.

20 Claims, 14 Drawing Sheets

(51) Int. Cl.
*B60W 50/06* (2006.01)
*B60W 50/14* (2020.01)
*B60W 50/00* (2006.01)

(52) U.S. Cl.
CPC ............ *B60W 50/06* (2013.01); *B60W 50/14* (2013.01); *B60W 60/0015* (2020.02); *B60W 2050/0014* (2013.01); *B60W 2050/146* (2013.01); *B60W 2554/4045* (2020.02)

(56) References Cited

OTHER PUBLICATIONS

Caesar et al., "Nuscenes: A Multimodal Dataset For Autonomous Driving", In Proceedings of the IEEE/CVF Conference on Computer Vision and Pattern Recognition, 2020, pp. 11621-11631.
Casas et al., "MP3: A Unified Model to Map, Perceive, Predict and Plan", In Proceedings of the IEEE/CVF Conference on Computer Vision and Pattern Recognition, 2021, pp. 14403-14412.
Chen et al., "PersFormer: 3D Lane Detection via Perspective Transformer and the OpenLane Benchmark", In European Conference on Computer Vision, Springer, Oct. 23, 2022, pp. 1-33.
Chen et al., "End-to-end Autonomous Driving: Challenges and Frontiers", In IEEE Transactions on Pattern Analysis And Machine Intelligence, Jun. 2023, pp. 1-21.
Claussmann et al., "A Review of Motion Planning for Highway Autonomous Driving", IEEE Transactions on Intelligent Transportation Systems, vol. 21, No. 5, May 15, 2019, pp. 1-24.
Dolgov et al., "Practical Search Techniques in Path Planning for Autonomous Driving", Ann Arbor, vol. 18, No. 80, 2008, pp. 32-37.
Dosovitskiy et al., "CARLA: An Open Urban Driving Simulator", In Proceedings of the 1st Annual Conference on Robot Learning, PMLR, vol. 78, No. 1, 2017. pp. 1-16.
Gu et al., "ViP3D: End-to-end Visual Trajectory Prediction via 3D Agent Queries", In Proceedings of the IEEE/CVF Conference on Computer Vision and Pattern Recognition, 2023, pp. 5496-5506.
He et al., "Deep Residual Learning for Image Recognition", In Proceedings of the IEEE Conference on Computer Vision and Pattern Recognition, 2016, pp. 770-778.
Hu et al., "Safe Local Motion Planning With Self-Supervised Freespace Forecasting", In Proceedings of the IEEE/CVF Conference on Computer Vision and Pattern Recognition, 2021, pp. 12732-12741.
Hu et al., "ST-P3: End-to-end Vision-based Autonomous Driving via Spatial-Temporal Feature Learning", In European Conference on Computer Vision, Springer, 2022, pp. 1-25.
Hu et al., "Planning-Oriented Autonomous Driving", In Proceedings of the IEEE/CVF Conference on Computer Vision and Pattern Recognition, 2023, pp. 17853-17862.
Huang et al., "BEVDet4D: Exploit Temporal Cues in Multi-camera 3D Object Detection", arXiv:2203.17054, Jun. 16, 2022, pp. 1-11.
Huang et al., "Leveraging Vision-Centric Multi-Modal Expertise for 3D Object Detection", In 37th Conference on Neural Information Processing Systems, 2023, pp. 1-16.
Jiang et al., "VAD: Vectorized Scene Representation for Efficient Autonomous Driving", In Proceedings of the IEEE/CVF International Conference on Computer Vision, Aug. 24, 2023, pp. 1-11.
Khurana et al., "Differentiable Raycasting for Self-Supervised Occupancy Forecasting", In European Conference on Computer Vision, Springer, Oct. 18, 2022, pp. 1-21.
Li et al., "Delving into the Devils of Bird's-eye-view Perception: A Review, Evaluation and Recipe", IEEE Transactions on Pattern Analysis and Machine Intelligence, Sep. 28, 2022, pp. 1-27.
Li et al., "MetaDrive: Composing Diverse Driving Scenarios for Generalizable Reinforcement Learning", IEEE transactions on pattern analysis and machine intelligence, vol. 45, No. 3, Jul. 16, 2022, pp. 1-14.
Li et al., "HDMapNet: An Online HD Map Construction and Evaluation Framework", In International Conference on Robotics and Automation, Mar. 18, 2022, pp. 1-7.
Li et al., "BEVDepth: Acquisition of Reliable Depth for Multi-view 3D Object Detection", AAAI Technical Track on Computer Vision II, Nov. 30, 2022, pp. 1-9.
Li et al., "BEVFormer: Learning Bird's-Eye-View Representation from Multi-Camera Images via Spatiotemporal Transformers", In European Conference on Computer Vision, Jul. 13, 2022, pp. 1-20.
Li et al., "FB-OCC: 3D Occupancy Prediction based on Forward-Backward View Transformation", arXiv preprint arXiv:2307.01492, Jul. 4, 2023, pp. 1-5.
Li et al., "FB-BEV: BEV Representation from Forward-Backward View Transformations", In Proceedings of the IEEE/CVF International Conference on Computer Vision, 2023, pp. 6919-6928.
Liao et al., "Maptr: Structured Modeling And Learning For Online Vectorized Hd Map Construction", arXiv preprint arXiv:2208.14437, Aug. 30, 2022, pp. 1-13 Pages.
Lin et al., "Sparse4D v2: Recurrent Temporal Fusion with Sparse Model", arXiv preprint arXiv:2305. 14018, May 24, 2023, pp. 1-10.
Liu et al., "SparseBEV: High-Performance Sparse 3D Object Detection from Multi-Camera Videos", In Proceedings of the IEEE/CVF International Conference on Computer Vision, 2023, pp. 18580-18590.
Liu et al., "PETRv2: A Unified Framework for 3D Perception from Multi-Camera Images", In Proceedings of the IEEE/CVF International Conference on Computer Vision, Nov. 14, 2022, pp. 1-10.
Liu et al., "VectorMapNet: End-to-end Vectorized HD Map Learning", In International Conference on Machine Learning, PMLR, 2023, pp. 1-18.
Park et al., "Time Will Tell: New Outlooks and A Baseline for Temporal Multi-View 3D Object Detection", arXiv:2210.02443, Oct. 5, 2022, pp. 1-23.
Philion et al., "Lift, Splat, Shoot: Encoding Images from Arbitrary Camera Rigs by Implicitly Unprojecting to 3D", In European Conference on Computer Vision, Aug. 13, 2020, pp. 1-17.
Prakash et al., "Multi-Modal Fusion Transformer for End-to-End Autonomous Driving", In Proceedings of the IEEE/CVF Conference on Computer Vision and Pattern Recognition, 2021, pp. 7077-7087.
Sadat et al., "Perceive, Predict, and Plan: Safe Motion Planning Through Interpretable Semantic Representations", In Computer Vision-ECCV 16th European Conference, Springer, 2020, pp. 1-16.
Shao et al., "Safety-Enhanced Autonomous Driving Using Interpretable Sensor Fusion Transformer", In 6th Conference on Robot Learning, PMLR, 2023, pp. 1-12.
Tampuu et al., "A Survey of End-to-End Driving: Architectures and Training Methods", In IEEE Transactions on Neural Networks and Learning Systems, vol. 33, No. 4, Mar. 2, 2021, pp. 1-23.
Vaswani et al., "Attention is All You Need", In 31st Conference on Neural Information Processing Systems, 2017, pp. 1-11.
Wang et al., "InterFusion: Interaction-based 4D Radar and LiDAR Fusion for 3D Object Detection", In IEEE/RSJ International Conference on Intelligent Robots and Systems, 2022, pp. 12247-12253.
Wang et al., "BEV-LaneDet: An Efficient 3D Lane Detection Based on Virtual Camera via Key-Points", In Proceedings of the IEEE/CVF Conference on Computer Vision and Pattern Recognition, 2023, pp. 1002-1011.
Wang et al., "Exploring Object-Centric Temporal Modeling for Efficient Multi-View 3D Object Detection", Proceedings of the IEEE/CVF International Conference on Computer Vision (ICCV), Jun. 7, 2023, pp. 1-12.
Wu et al., "Trajectory-guided Control Prediction for End-to-end Autonomous Driving: A Simple yet Strong Baseline", In 36th Conference on Neural Information Processing Systems, vol. 35, 2022, pp. 1-14.
Xie et al., "M2BEV: Multi-Camera Joint 3D Detection and Segmentation with Unified Bird's-Eye View Representation", arXiv preprint arXiv:2204.05088, 2022, pp. 1-21.
Yang et al., "BEVFormer v2: Adapting Modern Image Backbones to Bird's-Eye-View Recognition via Perspective Supervision", In Proceedings of the IEEE/CVF Conference on Computer Vision and Pattern Recognition, 2023, pp. 17830-17839.

(56) References Cited

OTHER PUBLICATIONS

Ye et al., "FusionAD: Multi-modality Fusion for Prediction and Planning Tasks of Autonomous Driving", arXiv preprint arXiv:2308.01006, Aug. 14, 2023, 8 Pages.
Yuan et al., "StreamMapNet: Streaming Mapping Network for Vectorized Online HD Map Construction", arXiv:2308.12570, Aug. 27, 2023, pp. 1-15.
Zhai et al., "Rethinking the Open-Loop Evaluation of End-to-End Autonomous Driving in nuScenes", arXiv:2305.10430, Oct. 22, 2023, 6 Pages.

* cited by examiner

TECHNIQUES FOR CONTROLLING VEHICLES WITHOUT OVER-RELIANCE ON VEHICLE STATUS INFORMATION

CROSS-REFERENCE TO RELATED APPLICATIONS

This application claims benefit of the United States Provisional Patent Applications titled "TECHNIQUES FOR OPEN-LOOP END-TO-END AUTONOMOUS DRIVING," filed Nov. 28, 2023, and having Ser. No. 63/603,597. The subject matter of this related application is hereby incorporated herein by reference.

BACKGROUND

Field of the Various Embodiments

The embodiments of the present disclosure relate generally to the fields of computer science, machine learning and artificial intelligence (AI), and autonomous vehicles, and more specifically, to techniques for controlling vehicles without over-reliance on vehicle status information.

Description of the Related Art

Machine learning can be used to discover trends, patterns, relationships, and/or other attributes related to large sets of complex, interconnected, and/or multidimensional data. To glean insights from large data sets, artificial neural networks, regression models, support vector machines, decision trees, naïve Bayes classifiers, and/or other types of machine learning models can be trained using input-output pairs in the data. In turn, the trained machine learning models can be used to guide decisions and/or perform tasks related to the data and/or other similar data.

One type of task that machine learning models can be trained to perform is controlling vehicles, such as autonomous and semiautonomous vehicles. However, extensive real-world driving data needs to be collected in order to properly train a machine learning model to control a vehicle, especially in view of the safety concerns surrounding autonomous and semiautonomous driving. The real-world driving data can include sensor data on the surrounding environment, such as camera images, light detection and ranging (LiDAR) data, and/or radio detection and ranging (RADAR) data. The real-world driving data can also include vehicle status information, which is oftentimes in the form of controller area network (CAN) bus data that can indicate the vehicle speed, acceleration, steering angle, braking, location, among other things.

One drawback of the above approach is the real-world driving data in data sets that are commonly used to train machine learning models to control vehicles are largely comprised of data associated with common driving scenarios, such as driving along a road in a straight line. Because vehicle status information can be a good predictor of human driving behaviors in most common driving scenarios, conventional machine learning models oftentimes become overly reliant on the vehicle status information during training, while largely ignoring sensor data.

When trained machine learning models are overly reliant on vehicle status information, the trained models can end up controlling vehicles in erroneous ways, which can result in dangerous driving scenarios that raise safety concerns. For example, a trained machine learning model that is over-reliant on vehicle status information could generate a plan for controlling a vehicle that does not account for sensor data indicating that a collision with another vehicle is imminent. In such a scenario, without some sort of human or manual override, an accident most likely would result.

As the foregoing illustrates, what is needed in the art are more effective techniques for controlling vehicles using machine learning models.

SUMMARY

One embodiment of the present disclosure sets forth a computer-implemented method for controlling a vehicle. The method includes processing sensor data associated with a vehicle using a first trained machine learning model to generate one or more bird's eye view (BEV) features. The method also includes performing one or more cross-attention operations based on the one or more BEV features and a learned embedding to generate an updated embedding. The method further includes processing the updated embedding using a second trained machine learning model to generate one or more trajectories. In addition, the method includes performing one or more operations to control the vehicle based on the one or more trajectories.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques enable a BEV-planner model to generate planned trajectories for a vehicle using sensor data related to the surrounding environment, without becoming overly reliant on vehicle status information. Accordingly, the disclosed techniques, when implemented to control vehicles, can result in those vehicles being driven in a manner that is safer and more similar to how human drivers drive vehicles than what can typically be achieved using conventional machine learning models. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide techniques for controlling vehicles using bird's eye view (BEV)-planner models that do not over-rely on vehicle status information. In some embodiments, a BEV-planner model includes a BEV model that converts sensor data and optionally vehicle status information into features from a BEV perspective. An attention module of the BEV-planner model performs cross-attention between the BEV features and a learned embedding to generate an updated embedding. Then, a planner model of the BEV-planner model processes the updated embedding to generate planned trajectories for a vehicle. An AV application can control the vehicle directly using the planned trajectories, or the AV application can transmit the trajectories to a controller that controls the vehicle. In some embodiments, the BEV-planner model can be trained using training data that includes sensor data, optional vehicle status information, and associated ground truth trajectories corresponding to human driving behaviors. In such cases, the training can include updating parameters of the BEV-planner model as well as the embedding that is learned during training. In addition, the trained BEV-planner model can be evaluated using one or more performance metrics that include (1) a rate at which trajectories generated by the BEV-planner model result in collisions with other vehicles that takes into account the yaw angle of the vehicle in the trajectories, and/or (2) a rate at which trajectories generated by the BEV-planner model result in collisions with a border of a drivable region of an environment.

The techniques for controlling vehicles using BEV-planner models have many real-world applications. For example, those techniques could be used to control autonomous or semiautonomous vehicles within real-world or virtual environments.

The above examples are not in any way intended to be limiting. As persons skilled in the art will appreciate, as a general matter, the techniques for controlling vehicles described herein can be implemented in any suitable application.

System Overview

Figure 1:
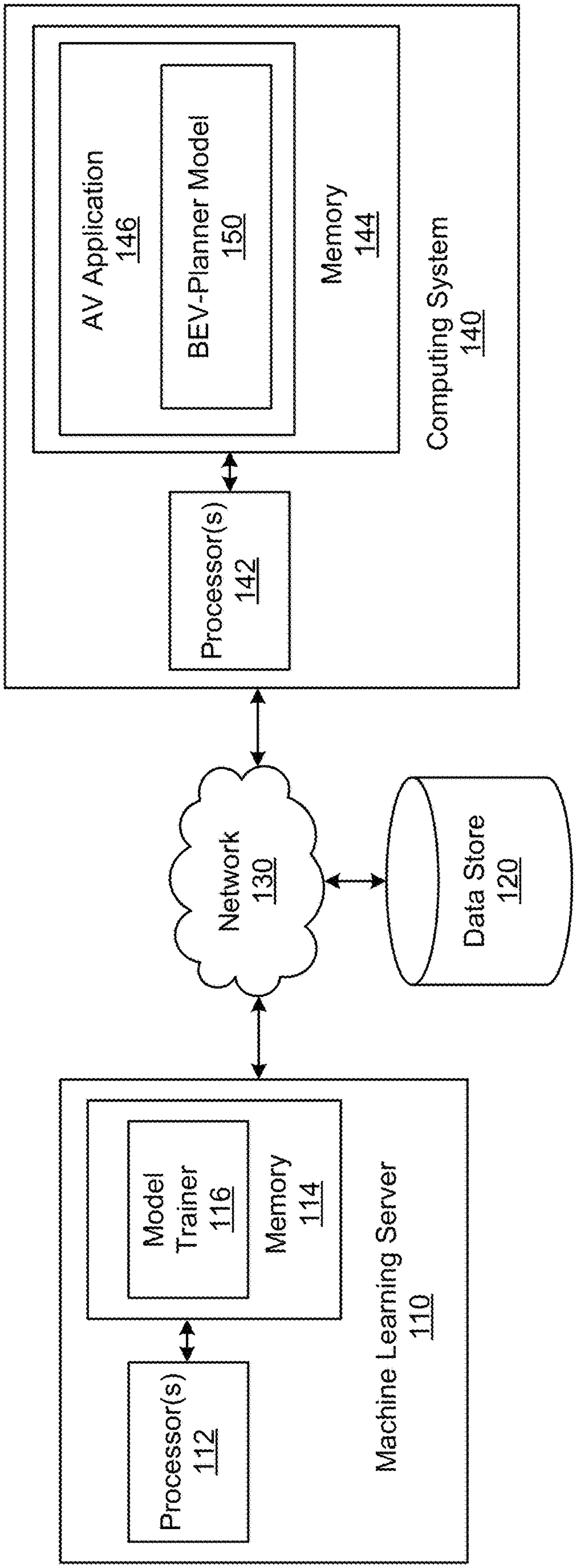
FIG. 1 illustrates a block diagram of a computer-based system configured to implement one or more aspects of the various embodiments.

FIG. 1 illustrates a block diagram of a computer-based system 100 configured to implement one or more aspects of various embodiments. As shown, the system 100 includes a machine learning server 110, a data store 120, and a computing system 140 in communication over a network 130, which can be a wide area network (WAN) such as the Internet, a local area network (LAN), a cellular network, and/or any other suitable network.

As shown, a model trainer 116 executes on one or more processors 112 of the machine learning server 110 and is stored in a system memory 114 of the machine learning server 110. The processor(s) 112 receive user input from input devices, such as a keyboard or a mouse. In operation, the processor(s) 112 may include one or more primary processors of the machine learning server 110, controlling and coordinating operations of other system components. In particular, the processor(s) 112 can issue commands that control the operation of one or more graphics processing units (GPUs) (not shown) and/or other parallel processing circuitry (e.g., parallel processing units, deep learning accelerators, etc.) that incorporates circuitry optimized for graphics and video processing, including, for example, video output circuitry. The GPU(s) can deliver pixels to a display device that can be any conventional cathode ray tube, liquid crystal display, light-emitting diode display, and/or the like.

The system memory 114 of the machine learning server 110 stores content, such as software applications and data, for use by the processor(s) 112 and the GPU(s) and/or other processing units. The system memory 114 can be any type of memory capable of storing data and software applications, such as a random-access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a Secure Digital Card, an external Flash memory, a portable compact disc read-only memory (CD-ROM), an optical storage device, a magnetic storage device, and/or any suitable combination of the foregoing.

The machine learning server 110 shown herein is for illustrative purposes only, and variations and modifications are possible without departing from the scope of the present disclosure. For example, the number of processors 112, the number of GPUs and/or other processing unit types, the number of system memories 114, and/or the number of applications included in the system memory 114 can be modified as desired. Further, the connection topology between the various units in FIG. 1 can be modified as desired. In some embodiments, any combination of the processor(s) 112, the system memory 114, and/or GPU(s) can be included in and/or replaced with any type of virtual computing system, distributed computing system, and/or cloud computing environment, such as a public, private, or a hybrid cloud system.

In some embodiments, the model trainer 116 is configured to train one or more machine learning models, including a bird's-eye view (BEV)-planner model 150 that is trained to generate trajectories for controlling a vehicle, among other things. Techniques that the model trainer 116 can employ to train the BEV-planner model 150 are discussed in greater detail below in conjunction with FIGS. 6 and 10-11. Training data and/or trained (or deployed) machine learning models, including the BEV-planner model 150, can be stored in the data store 120 or elsewhere. In some embodiments, the data store 120 can include any storage device or devices, such as fixed disc drive(s), flash drive(s), optical storage, network attached storage (NAS), and/or a storage area-network (SAN). Although shown as accessible over the network 130, in at least one embodiment the machine learning server 110 can include the data store 120.

As shown, an autonomous vehicle (AV) application 146 that uses the BEV-planner model 150 is stored in a system memory 144, and executes on a processor 142, of the computing system 140. Once trained, the BEV-planner model 150 can be deployed, such as via AV application 146. In some embodiments, given sensor data captured by one or more sensors (not shown) and optional vehicle information, the AV application 146 can use the BEV-planner model 150 to generate trajectories for controlling a vehicle, as discussed in greater detail below in conjunction with FIGS. 5-6 and 8-9.

Figure 2:
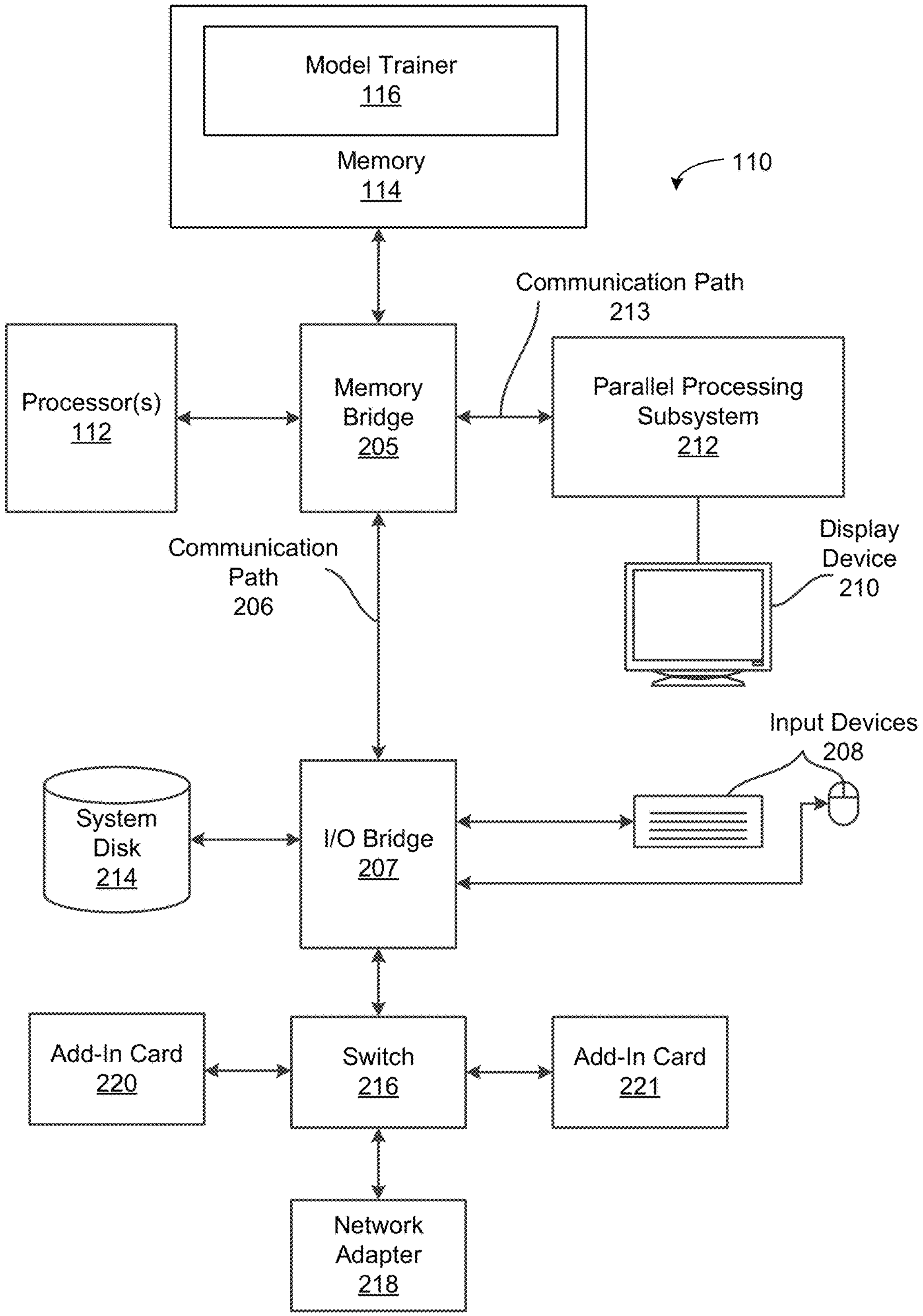
FIG. 2 is a more detailed illustration of the machine learning server of FIG. 1, according to various embodiments.

FIG. 2 is a more detailed illustration of the machine learning server 110 of FIG. 1, according to various embodiments. In some embodiments, the machine learning server 110 can include any type of computing system, including, without limitation, a server machine, a server platform, a desktop machine, a laptop machine, a hand-held/mobile device, a digital kiosk, an in-vehicle infotainment system, and/or a wearable device. In some embodiments, the machine learning server 110 is a server machine operating in a data center or a cloud computing environment that provides scalable computing resources as a service over a network.

In some embodiments, the machine learning server 110 includes, without limitation, the processor(s) 112 and the memory(ies) 114 coupled to a parallel processing subsystem 212 via a memory bridge 205 and a communication path 206. Memory bridge 205 is further coupled to an I/O (input/output) bridge 207 via a communication path 206, and I/O bridge 207 is, in turn, coupled to a switch 216.

In some embodiments, the I/O bridge 207 is configured to receive user input information from optional input devices 208, such as a keyboard, mouse, touch screen, sensor data analysis (e.g., evaluating gestures, speech, or other information about one or more uses in a field of view or sensory field of one or more sensors), and/or the like, and forward the input information to the processor(s) 112 for processing. In some embodiments, the machine learning server 110 can be a server machine in a cloud computing environment. In such embodiments, the machine learning server 110 can not include input devices 208, but can receive equivalent input information by receiving commands (e.g., responsive to one or more inputs from a remote computing device) in the form of messages transmitted over a network and received via a network adapter 218. In some embodiments, the switch 216 is configured to provide connections between I/O bridge 207 and other components of the machine learning server 110, such as a network adapter 218 and various add in cards 220 and 221.

In some embodiments, the I/O bridge 207 is coupled to a system disk 214 that may be configured to store content and applications and data for use by the processor(s) 112 and the parallel processing subsystem 212. In some embodiments, the system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In some embodiments, other components, such as universal serial bus or other port connections, compact disc drives, digital versatile disc drives, film recording devices, and the like, may be connected to the I/O bridge 207 as well.

In some embodiments, the memory bridge 205 may be a Northbridge chip, and the I/O bridge 207 may be a Southbridge chip. In addition, the communication paths 206 and 213, as well as other communication paths within the machine learning server 110, can be implemented using any technically suitable protocols, including, without limitation, AGP (Accelerated Graphics Port), HyperTransport, or any other bus or point to point communication protocol known in the art.

In some embodiments, the parallel processing subsystem 212 comprises a graphics subsystem that delivers pixels to an optional display device 210 that may be any conventional cathode ray tube, liquid crystal display, light-emitting diode display, and/or the like. In such embodiments, the parallel processing subsystem 212 may incorporate circuitry optimized for graphics and video processing, including, for example, video output circuitry. Such circuitry may be incorporated across one or more parallel processing units (PPUs), also referred to herein as parallel processors, included within the parallel processing subsystem 212.

In some embodiments, the parallel processing subsystem 212 incorporates circuitry optimized (e.g., that undergoes optimization) for general purpose and/or compute processing. Again, such circuitry may be incorporated across one or more PPUs included within the parallel processing subsystem 212 that are configured to perform such general purpose and/or compute operations. In yet other embodiments, the one or more PPUs included within the parallel processing subsystem 212 may be configured to perform graphics processing, general purpose processing, and/or compute processing operations. The system memory 114 includes at least one device driver configured to manage the processing operations of the one or more PPUs within the parallel processing subsystem 212. In addition, the system memory 114 includes the model trainer 116, discussed in greater detail below in conjunction with FIGS. 6 and 10-11. Although described herein primarily with respect to the model trainer 116, techniques disclosed herein can also be implemented, either entirely or in part, in other software and/or hardware, such as in the parallel processing subsystem 212.

In some embodiments, the parallel processing subsystem 212 can be integrated with one or more of the other elements of FIG. 2 to form a single system. For example, the parallel processing subsystem 212 can be integrated with the processor(s) 112 and other connection circuitry on a single chip to form a system on a chip (SoC).

In some embodiments, the processor(s) 112 includes the primary processor of the machine learning server 110, controlling and coordinating operations of other system components. In some embodiments, the processor(s) 112 issues commands that control the operation of PPUs. In some embodiments, the communication path 213 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of processor(s) 112, and the number of parallel processing subsystems 212, can be modified as desired. For example, in some embodiments, the system memory 114 could be connected to the processor(s) 112 directly rather than through the memory bridge 205, and other devices can communicate with the system memory 114 via the memory bridge 205 and the processor(s) 112. In other embodiments, the parallel processing subsystem 212 can be connected to the I/O bridge 207 or directly to the processor(s) 112, rather than to the memory bridge 205. In still other embodiments, the I/O bridge 207 and the memory bridge 205 can be integrated into a single chip instead of existing as one or more discrete devices. In certain embodiments, one or more components shown in FIG. 2 may not be present. For example, the switch 216 could be eliminated, and the network adapter 218 and add in cards 220, 221 would connect directly to the I/O bridge 207. Lastly, in certain embodiments, one or more components shown in FIG. 2 may be implemented as virtualized resources in a virtual computing environment, such as a cloud computing environment. In particular, the parallel processing subsystem 212 may be implemented as a virtualized parallel processing subsystem in some embodiments. For example, the parallel processing subsystem 212 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Figure 3:
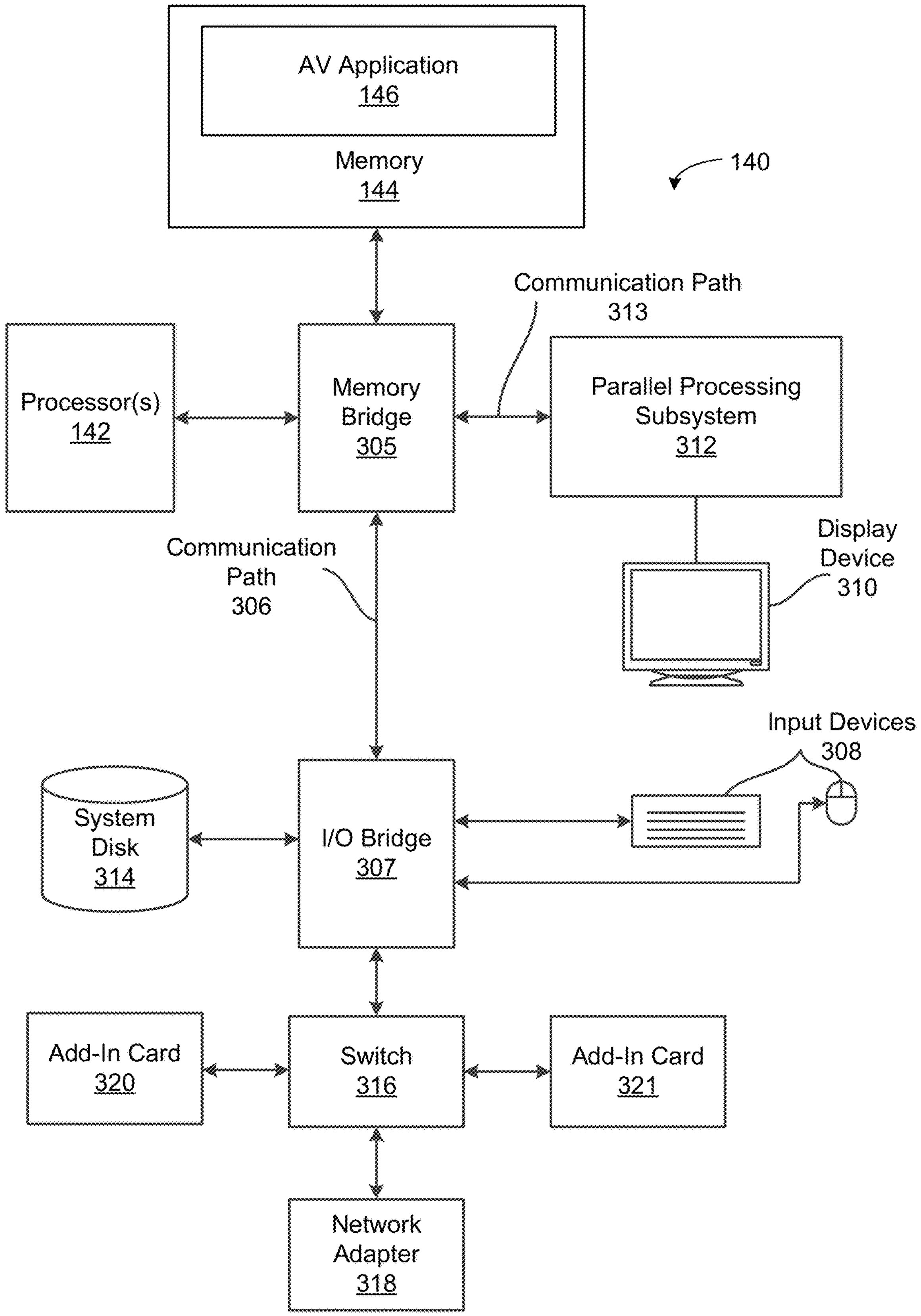
FIG. 3 is a more detailed illustration of the computing system of FIG. 1, according to various embodiments.

FIG. 3 is a more detailed illustration of the computing system 140 of FIG. 1, according to various embodiments. In some embodiments, the computing system 140 can include any type of computing system, including, without limitation, a server machine, a server platform, a desktop machine, a laptop machine, a hand-held/mobile device, a digital kiosk, an in-vehicle infotainment system, and/or a wearable device. In some embodiments, the computing system 140 is a server machine operating in a data center or a cloud computing environment that provides scalable computing resources as a service over a network.

In some embodiments, the computing system 140 includes, without limitation, the processor(s) 142 and the memory(ies) 144 coupled to a parallel processing subsystem 312 via a memory bridge 305 and a communication path 306. Memory bridge 305 is further coupled to an I/O (input/output) bridge 307 via a communication path 306, and I/O bridge 307 is, in turn, coupled to a switch 316.

In some embodiments, the I/O bridge 307 is configured to receive user input information from optional input devices 308, such as a keyboard, mouse, touch screen, sensor data analysis (e.g., evaluating gestures, speech, or other information about one or more uses in a field of view or sensory field of one or more sensors), and/or the like, and forward the input information to the processor(s) 142 for processing. In some embodiments, the computing system 140 can be a server machine in a cloud computing environment. In such embodiments, the computing system 140 can not include the input devices 308, but can receive equivalent input information by receiving commands (e.g., responsive to one or more inputs from a remote computing device) in the form of messages transmitted over a network and received via a network adapter 318. In some embodiments, the switch 316 is configured to provide connections between I/O bridge 307 and other components of the computing system 140, such as a network adapter 318 and various add in cards 320 and 321.

In some embodiments, the I/O bridge 307 is coupled to a system disk 314 that may be configured to store content and applications and data for use by the processor(s) 312 and the parallel processing subsystem 312. In some embodiments, the system disk 314 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In some embodiments, other components, such as universal serial bus or other port connections, compact disc drives, digital versatile disc drives, film recording devices, and the like, may be connected to the I/O bridge 307 as well.

In some embodiments, the memory bridge 305 may be a Northbridge chip, and the I/O bridge 307 may be a Southbridge chip. In addition, the communication paths 306 and 313, as well as other communication paths within the computing system 140, can be implemented using any technically suitable protocols, including, without limitation, AGP (Accelerated Graphics Port), HyperTransport, or any other bus or point to point communication protocol known in the art.

In some embodiments, the parallel processing subsystem 312 comprises a graphics subsystem that delivers pixels to an optional display device 310 that may be any conventional cathode ray tube, liquid crystal display, light-emitting diode display, and/or the like. In such embodiments, the parallel processing subsystem 312 may incorporate circuitry optimized for graphics and video processing, including, for example, video output circuitry. Such circuitry may be incorporated across one or more parallel processing units (PPUs), also referred to herein as parallel processors, included within the parallel processing subsystem 312.

In some embodiments, the parallel processing subsystem 312 incorporates circuitry optimized (e.g., that undergoes optimization) for general purpose and/or compute processing. Again, such circuitry may be incorporated across one or more PPUs included within the parallel processing subsystem 312 that are configured to perform such general purpose and/or compute operations. In yet other embodiments, the one or more PPUs included within the parallel processing subsystem 312 may be configured to perform graphics processing, general purpose processing, and/or compute processing operations. The system memory 144 includes at least one device driver configured to manage the processing operations of the one or more PPUs within the parallel processing subsystem 312. In addition, the system memory 144 includes the AV application 146, discussed in greater detail in conjunction with FIGS. 5 and 8-9. Although described herein primarily with respect to the AV application 146, techniques disclosed herein can also be implemented, either entirely or in part, in other software and/or hardware, such as in the parallel processing subsystem 312.

In some embodiments, the parallel processing subsystem 312 can be integrated with one or more of the other elements of FIG. 3 to form a single system. For example, the parallel processing subsystem 312 can be integrated with the processor(s) 142 and other connection circuitry on a single chip to form a system on a chip (SoC).

In some embodiments, the processor(s) 142 includes the primary processor of the computing system 140, controlling and coordinating operations of other system components. In some embodiments, the processor(s) 142 issues commands that control the operation of PPUs. In some embodiments, the communication path 313 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of processor(s) 312, and the number of parallel processing subsystems 312, can be modified as desired. For example, in some embodiments, the system memory 144 could be connected to the processor(s) 142 directly rather than through the memory bridge 305, and other devices can communicate with system memory 144 via the memory bridge 305 and the processor(s) 142. In other embodiments, the parallel processing subsystem 312 can be connected to the I/O bridge 307 or directly to the processor(s) 142, rather than to the memory bridge 305. In still other embodiments, I/O bridge 307 and the memory bridge 305 can be integrated into a single chip instead of existing as one or more discrete devices. In certain embodiments, one or more components shown in FIG. 3 may not be present. For example, the switch 316 could be eliminated, and the network adapter 318 and add the in cards 320, 321 would connect directly to the I/O bridge 307. Lastly, in certain embodiments, one or more components shown in FIG. 3 may be implemented as virtualized resources in a virtual computing environment, such as a cloud computing environment. In particular, the parallel processing subsystem 312 may be implemented as a virtualized parallel processing subsystem in some embodiments. For example, the parallel processing subsystem 312 may be implemented as a virtual graphics processing unit(s) (vGPU(s)) that renders graphics on a virtual machine(s) (VM(s)) executing on a server machine(s) whose GPU(s) and other physical resources are shared across one or more VMs.

In some embodiments, the computing system 140 described herein can be executed using similar components, features, and/or functionality to those of example autonomous vehicle 400 of FIGS. 4A-4D. The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Exemplar Autonomous Vehicle

Figure 4A:
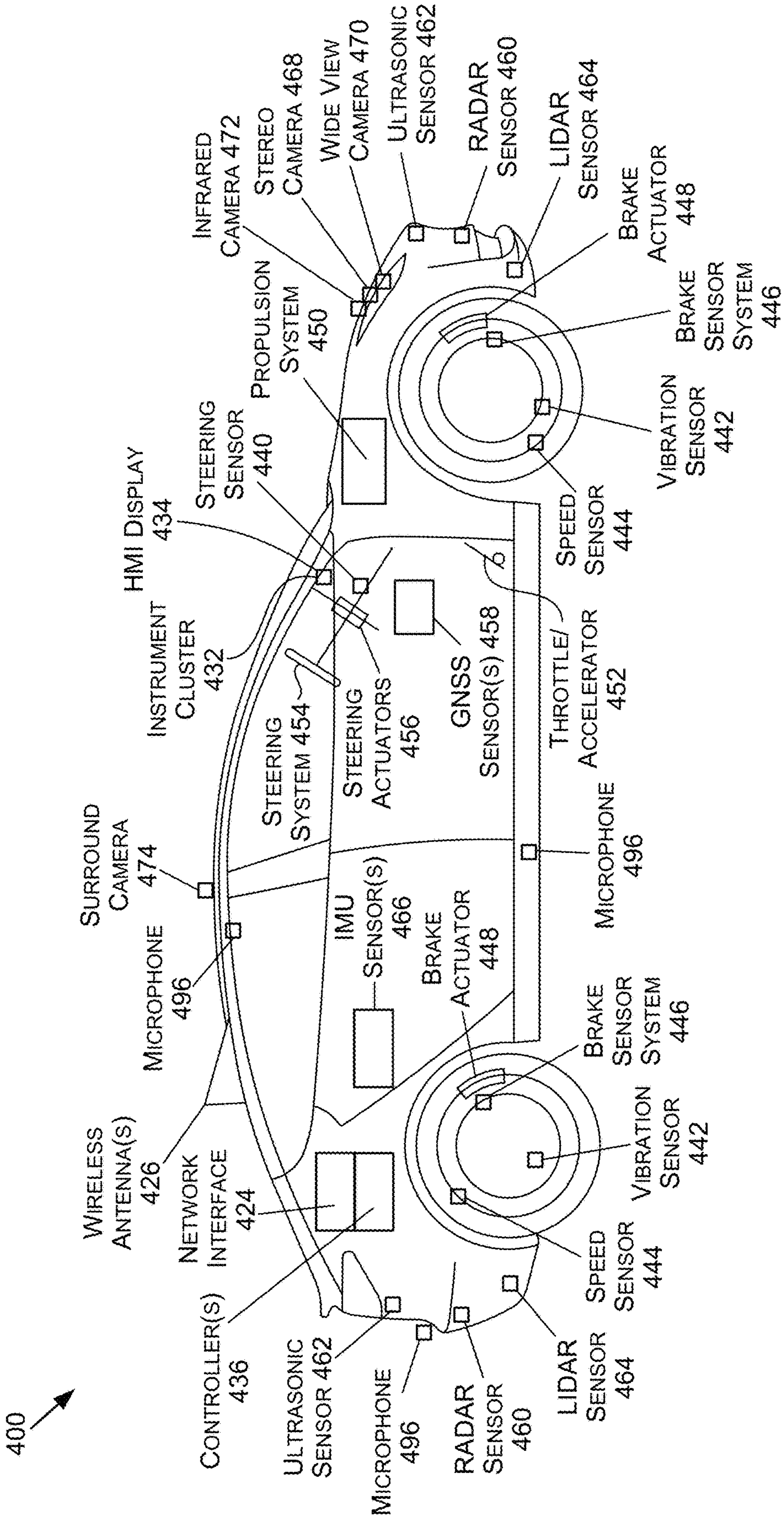
FIG. 4A is an illustration of an exemplar autonomous vehicle, according to various embodiments.

FIG. 4A is an illustration of an exemplar autonomous vehicle 400, according to various embodiments. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-401806, published on Jun. 15, 4018, Standard No. J3016-401609, published on Sep. 30, 4016, and previous and future versions of this standard). The vehicle 400 may be capable of functionality in accordance with one or more of Level 3-Level 5 of the autonomous driving levels. The vehicle 400 may be capable of functionality in accordance with one or more of Level 1-Level 5 of the autonomous driving levels. For example, the vehicle 400 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 400 or other machine, such as being fully autonomous, being highly autonomous, being conditionally autonomous, being partially autonomous, providing assistive autonomy, being semi-autonomous, being primarily autonomous, or other designation.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators 448, to operate the steering system 454 via one or more steering actuators 456, to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems ("GNSS") sensor(s) 458 (e.g., Global Positioning System sensor(s)), RADAR sensor(s) 460, ultrasonic sensor(s) 462, LIDAR sensor(s) 464, inertial measurement unit (IMU) sensor(s) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s) 444 (e.g., for measuring the speed of the vehicle 400), vibration sensor(s) 442, steering sensor(s) 440, brake sensor(s) (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the High Definition ("HD") map 422 of FIG. 4C), location data (e.g., the vehicle's 400 location, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424 which may use one or more wireless antenna(s) 426 and/or modem(s) to communicate over one or more networks. For example, the network interface 424 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA4000"), etc. The wireless antenna(s) 426 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 4B:
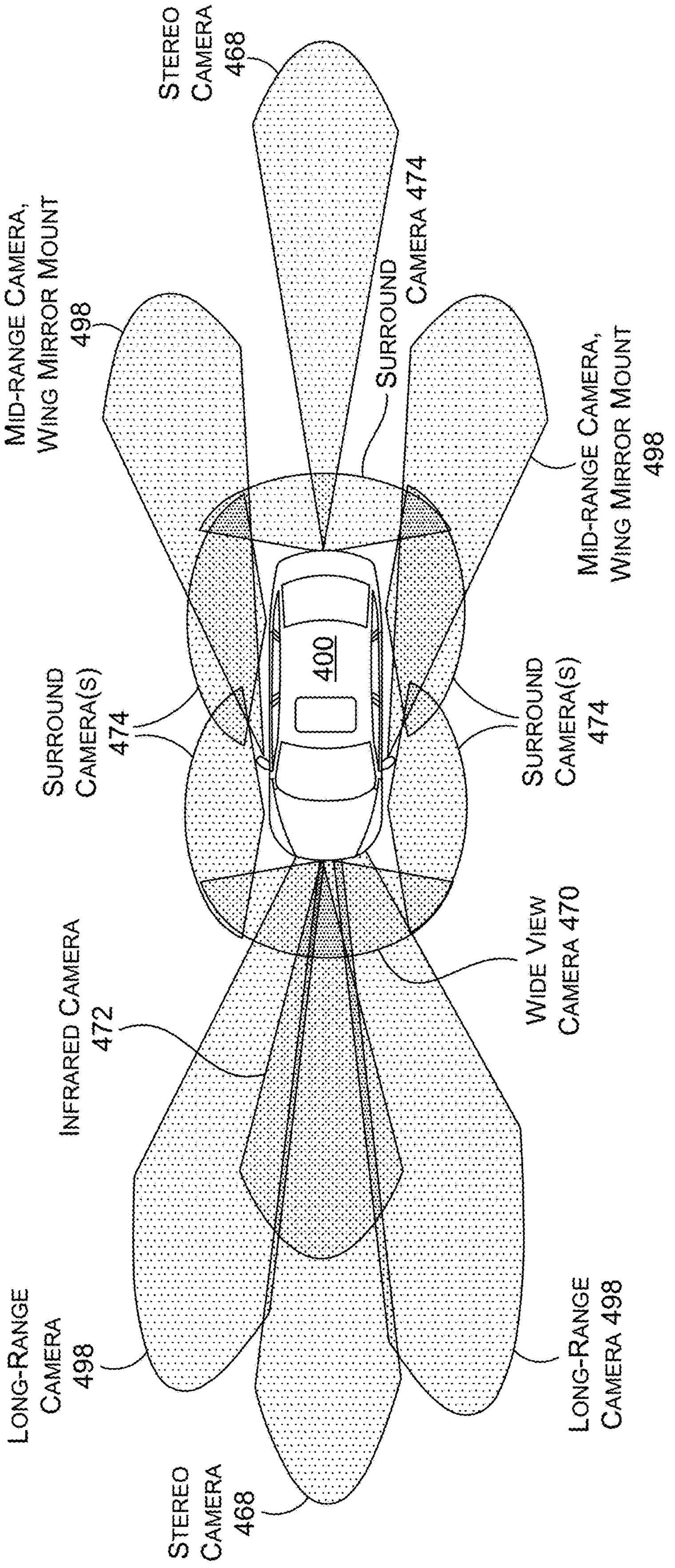
FIG. 4B illustrates exemplar camera locations and fields of view for the exemplar autonomous vehicle of FIG. 4A, according to various embodiments.

FIG. 4B illustrates exemplar camera locations and fields of view for the exemplar autonomous vehicle 400 of FIG. 4A, according to various embodiments. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 120 fps, 440 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 400 (e.g., front-facing cameras) may be used for surround view, to help identify forward facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may be any number (including zero) of wide-view cameras 470 on the vehicle 400. In addition, any number of long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

Any number of stereo cameras 468 may also be included in a front-facing configuration. In some embodiments, one or more of stereo camera(s) 468 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that include portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned on the vehicle 400. The surround camera(s) 474 may include wide-view camera(s) 470, fisheye camera(s), 360 degree camera(s), and/or the like. Four example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Figure 4C:
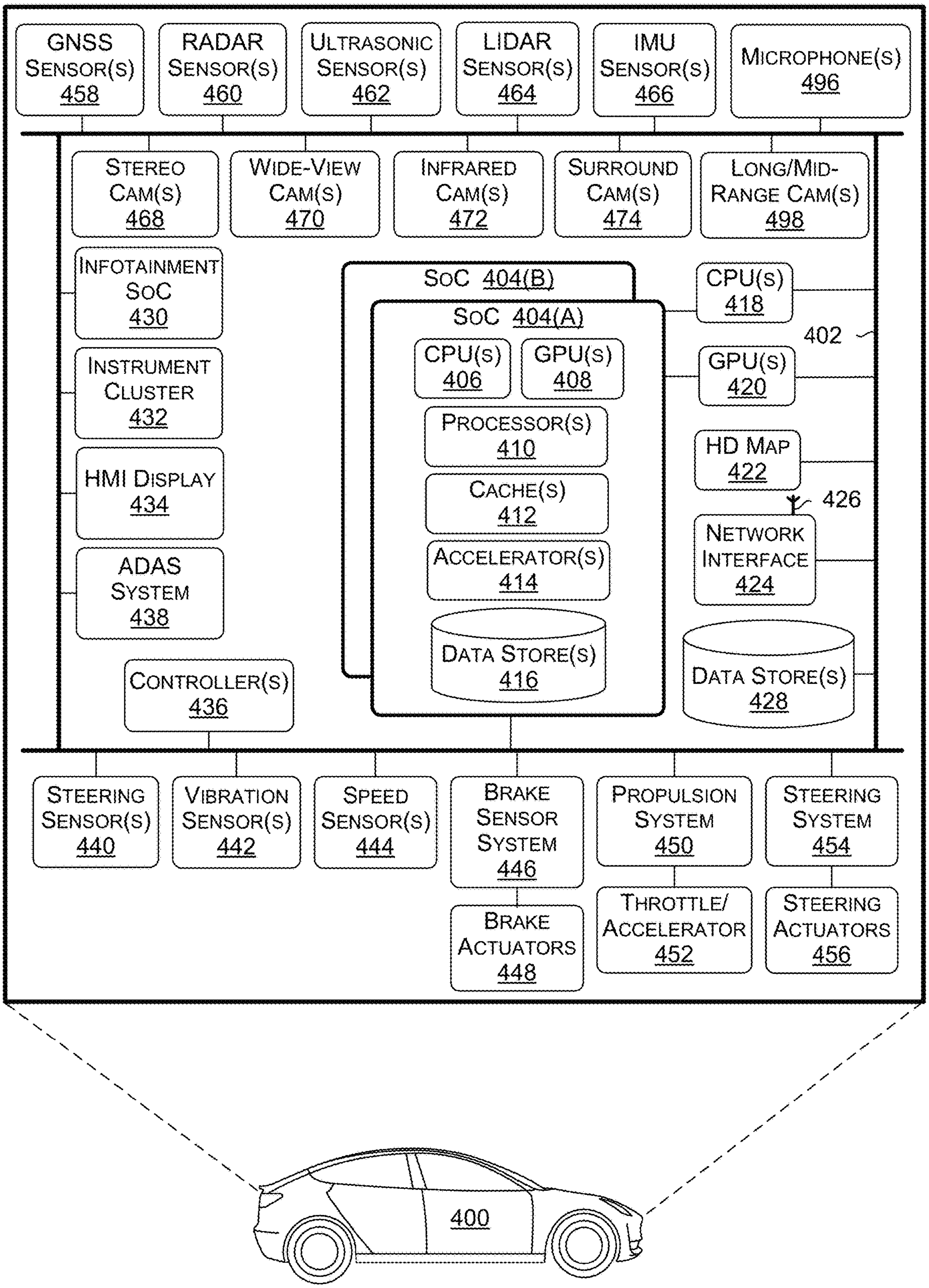
FIG. 4C is a block diagram of an exemplar system architecture for the exemplar autonomous vehicle of FIG. 4A, according to various embodiments.

FIG. 4C is a block diagram of an exemplar system architecture for the exemplar autonomous vehicle 400 of FIG. 4A, according to various embodiments. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C are illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such the CAN bus.

The vehicle 400 may include one or more controller(s) 436, such as those described herein with respect to FIG. 4A. The controller(s) 436 may be used for a variety of functions. The controller(s) 436 may be coupled to any of the various other components and systems of the vehicle 400, and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. In some embodiments, components (e.g., CPU(s) 410 and data store(s) 416) included in the vehicle 400 can be the same as, or similar to, corresponding components (e.g., processor(s) 142 and memory(ies) 144) included in the computing system 140, described above in conjunction with FIG. 1. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 408 may include at least eight streaming microprocessors. The GPU(s) 408 may use compute application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 46262 or IEC 61508 standards, although other standards and protocols may be used.

In some examples, the SoC(s) 404 may include a real-time ray-tracing hardware accelerator, such as described in U.S. patent application Ser. No. 16/101,432, filed on Aug. 10, 4018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor (s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 412 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high-dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and active doing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role.

The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, that use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s) 418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 426 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include a SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA4000, Bluetooth, Bluetooth LE, Wi-Fi, Z-Wave, ZigBee, LoRaWAN, and/or other wireless protocols.

The vehicle 400 may further include data store(s) 428 which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458. The GNSS sensor(s) 458 (e.g., GPS, assisted GPS sensors, differential GPS (DGPS) sensors, etc.), to assist in mapping, perception, occupancy grid generation, and/or path planning functions. Any number of GNSS sensor(s) 458 may be used, including, for example and without limitation, a GPS using a USB connector with an Ethernet to Serial (RS-432) bridge.

The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 450 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 400 surroundings at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 460 m (front) or 80 m (rear), and a field of view of up to 42 degrees (front) or 450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 400 m, with an accuracy of 2 cm-3 cm, and with support for a 400 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 120-degree horizontal and 35-degree vertical field-of-view, with a 400 m range even for low-reflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 400 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include a SoC, in some examples. The ADAS system 438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjust the vehicle speed to maintain a safe distance from vehicles ahead. Lateral ACC performs distance keeping, and advises the vehicle 400 to change lanes when necessary. Lateral ACC is related to other ADAS applications such as LCA and CWS.

CACC uses information from other vehicles that may be received via the network interface 424 and/or the wireless antenna(s) 426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 400), while the I2V communication concept provides information about traffic further ahead. CACC systems may include either or both I2V and V2V information sources. Given the information of the vehicles ahead of the vehicle 400, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network which is trained and thus reduces the risk of false positives, as described herein.

The vehicle 400 may further include the infotainment SoC 430 (e.g., an in-vehicle infotainment system (IVI)). Although illustrated and described as a SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 400. For example, the infotainment SoC 430 may radios, disk players, navigation systems, video players, USB and Bluetooth connectivity, carputers, in-car entertainment, Wi-Fi, steering wheel audio controls, hands free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
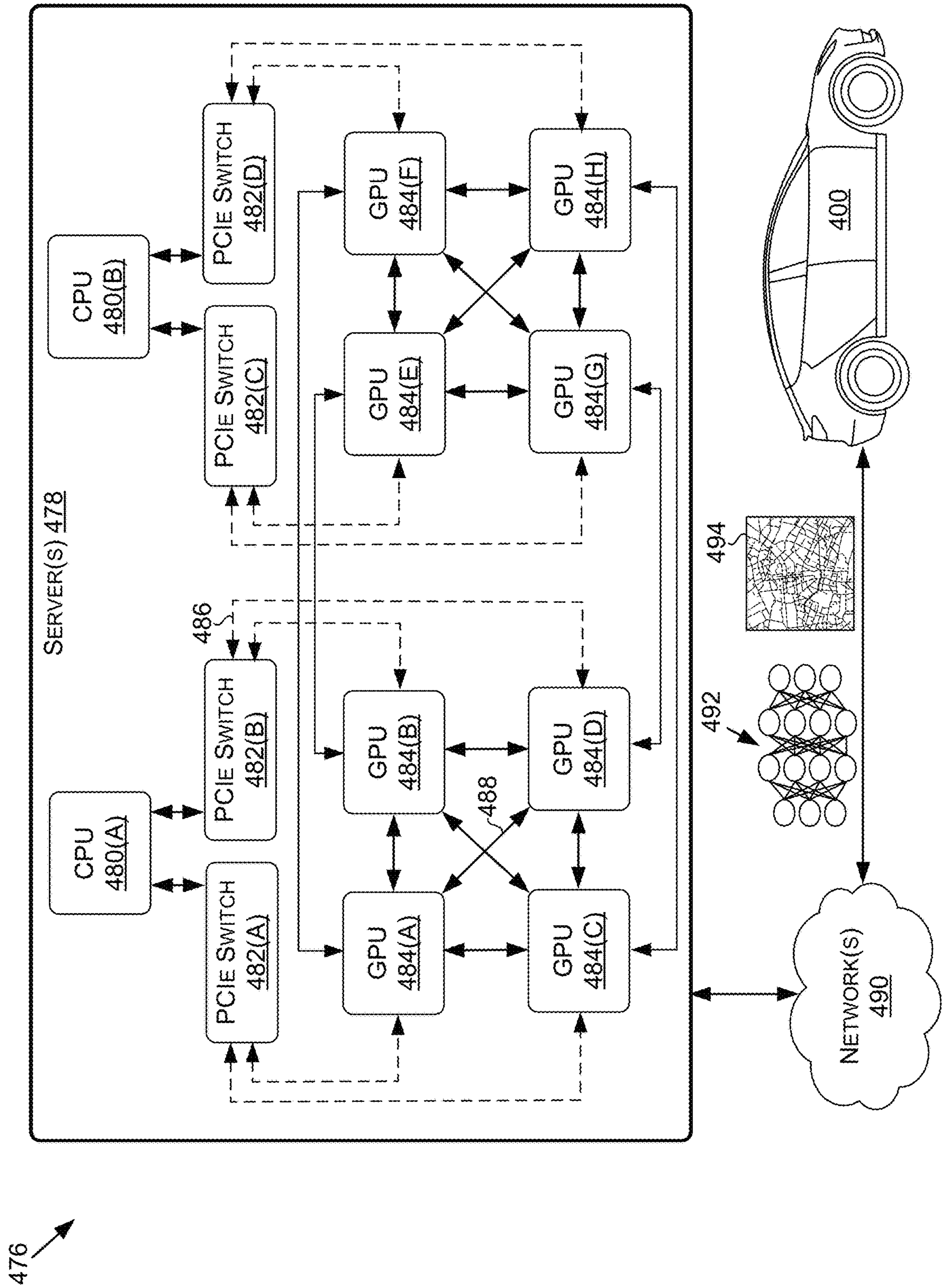
FIG. 4D is a system diagram for communication between cloud-based server(s) and the exemplar autonomous vehicle of FIG. 4A, according to various embodiments.

FIG. 4D is a system diagram for communication between cloud-based server(s) and the exemplar autonomous vehicle 400 of FIG. 4A, according to various embodiments. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced road-work. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Figure 5:
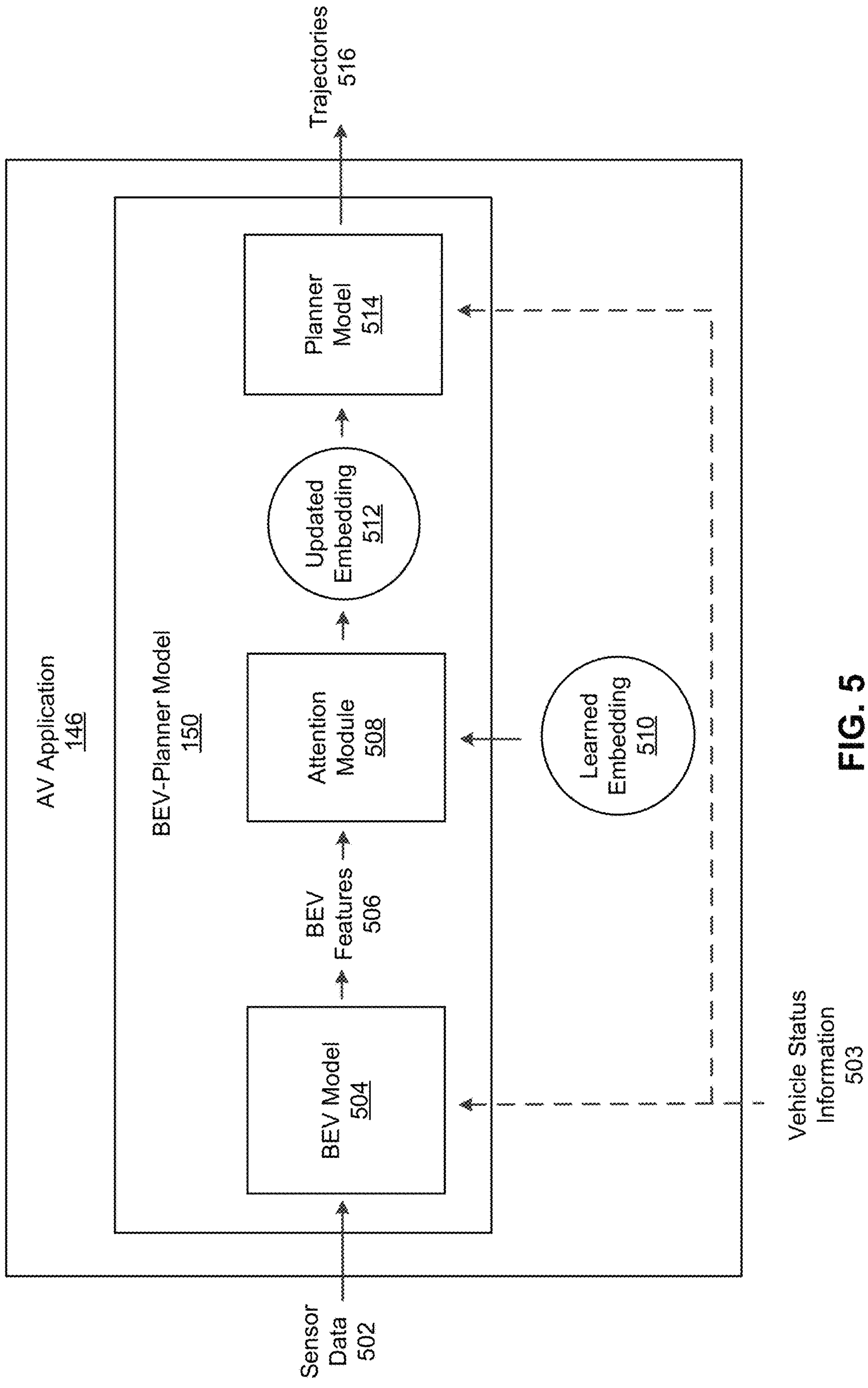
FIG. 5 is a more detailed illustration of the autonomous vehicle application of FIG. 1, according to various embodiments.

Controlling Autonomous Vehicles without Over-Reliance on Vehicle Status Information FIG. 5 is a more detailed illustration of the autonomous vehicle application 146 of FIG. 1, according to various embodiments. As shown, the AV application 146 includes the BEV-planner model 150 and a learned embedding 510. In some embodiments, the BEV-planner model 150 is a machine learning model having a transformer attention architecture. Illustratively, the BEV-planner model 150 includes a BEV model 504, an attention module 508, and a planner model 514. Each of the BEV model 504, the attention module 508, and the planner model 514 can be implemented as an artificial neural network in some embodiments.

In operation, the AV application 146 receives sensor data 502 and, optionally, vehicle status information 503. Any technically feasible sensor data 502, such as image data, light detection and ranging (LIDAR) data, and/or radio detection and ranging (RADAR) data, that is captured by one or more sensors mounted on a vehicle, can be received by the AV application 146 in some embodiments. Any suitable vehicle status information 503, such as controller area network (CAN) bus information (e.g., information on the vehicle speed, acceleration, steering angle, braking, location, etc.), can be received by the AV application 146 in some embodiments.

The AV application 146 inputs the sensor data 502 and, optionally, the vehicle status information 503, into the BEV-planner model 150, which processes such inputs to generate one or more trajectories (also referred to herein as "trajectories") 516 for the vehicle to follow. Given the sensor data 502 and the optional vehicle status information 503, the BEV model 504 in the BEV-planner model 150 converts the sensor data 502 and the optional vehicle status information 503 into features from a BEV perspective (also referred to herein as "BEV features") 506. The BEV features 506 are a feature representation of a surrounding of the vehicle (e.g., a 50 m or 100 m surrounding) from a top-down perspective. In some embodiments, the BEV features 506 can also be concatenated with historical BEV features (not shown) generated during previous time steps, if any. While concatenating the BEV features 506 with the historical BEV features, feature alignment may not be performed in some embodiments.

The attention module 508 of the BEV-planner model 150 performs cross-attention between the BEV features 506 (concatenated with historical BEV features) and the learned embedding 510 to generate an updated embedding 512 that is a combination of the BEV features 506 and the learned embedding 510. The learned embedding 510 can be a query that is learned during training of the BEV-planner model 150, discussed in greater below in conjunction with FIG. 6.

The planner model 514 of the BEV-planner model 150 processes the updated embedding 512 and, optionally, the vehicle status information 503 to generate planned trajectories 516 for a vehicle. In some embodiments, the planner model 514 can be a multi-layer perceptron (MLP). Any suitable trajectories 516 can be generated in some embodiments. For example, in some embodiments, the trajectories 516 can be generated for a future window of time (e.g., a next few seconds) and include x, y coordinates for one or more waypoints; x, y, z coordinates for one or more waypoints; or x, y and orientation coordinates for one or more waypoints, which can be input into a controller that generates one or more control signals for controlling a vehicle. As another example, in some embodiments, the AV application 146 can directly generate one or more control signals for controlling a vehicle from the trajectories 516.

More formally, processing of the sensor data 502 and the optional vehicle status information 503 by the BEV-planner model 150 can be formulated as follows:

$$\tau = MLP(attn(q = Q, k = B, v = B)), \tag{1}$$

where Q is the learned embedding 510, B is the BEV features 506 after temporal fusion, and t is the predicted trajectories.

Figure 6:
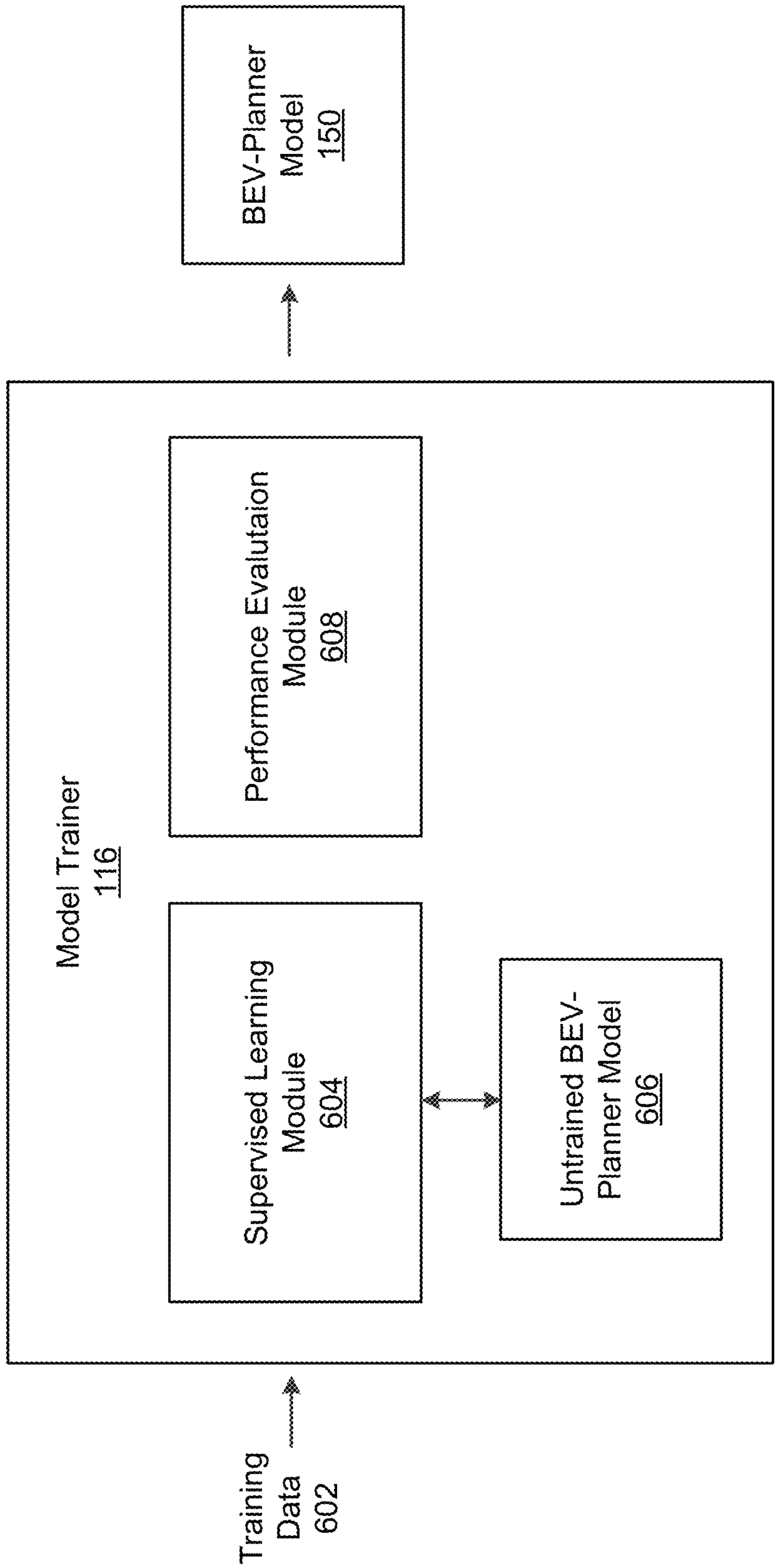
FIG. 6 is a more detailed illustration of the model trainer of FIG. 1, according to various embodiments.

FIG. 6 is a more detailed illustration of the model trainer 116 of FIG. 1, according to various embodiments. As shown, the model trainer 116 includes a supervised learning module 604 and a performance evaluation module 608. In operation, the model trainer 116 receives training data 602 as input, and the supervised learning model 604 trains an untrained BEV-planner model 606 to generate the trained BEV-planner model 150. In some embodiments, the training data 602 can include sensor data (e.g., image data, LIDAR data, and/or RADAR data), optional vehicle status information (e.g., CAN bus information), and associated ground truth trajectories from real-world driving data.

In some embodiments, the untrained BEV-planner model 606 can include a BEV model, an attention module, and a planner model, similar to the BEV-planner model 150 described above in conjunction with FIG. 5. In such cases, the supervised learning model 604 can perform end-to-end training of the BEV model, the attention module, and the planner model of the untrained BEV-planner model 606, along with the embedding 510. During the training, the untrained BEV-planner model 606 can begin with randomly initialized parameters, and the model trainer 116 iteratively updates the parameters based on a loss that is computed from trajectories generated by the untrained BEV-planner model 606 for portions of the training data 606 and corresponding ground truth trajectories for a number of frames of the training data, such as a number of keyframes that are a subset of the total frames in the training data. For example, in some embodiments, the loss can be an L1 or an L2 loss, and parameters of the untrained BEV-planner model 606 can be updated using backpropagation with gradient descent, or a variation thereof.

Subsequent to training, the performance evaluation module 608, or another application (not shown), can evaluate a performance of the BEV-planner model 150 using various performance metrics, discussed in greater detail below in conjunction with FIG. 7. After the evaluation, the model trainer 116 (or other application) can display the performance metrics via a display device in some embodiments. In addition or alternatively, in some embodiments, the model trainer 116 can re-train the BEV-planner model 150 model using additional training data, either in response to a request from a user to whom the performance metrics are displayed, or automatically if, for example, one or more of the performance metrics satisfy a threshold for re-training the BEV-planner model 150.

Figure 7A:
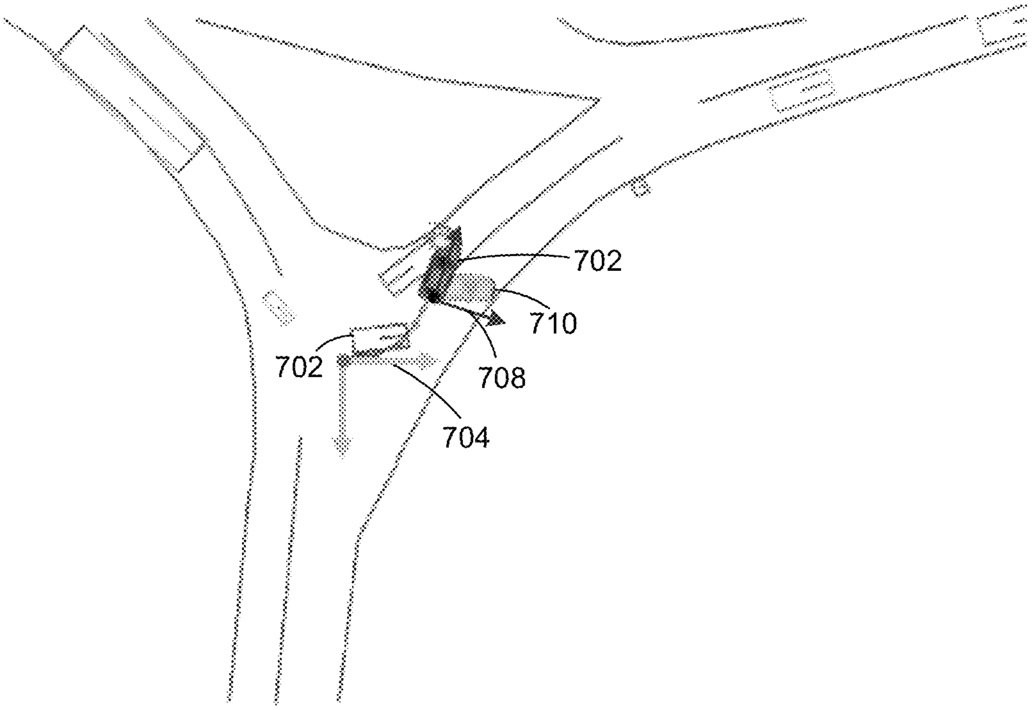
FIGS. 7A-7B illustrate exemplar performance metric evaluations of the bird's eye view (BEV)-planner model of FIG. 1, according to various embodiments.
Figure 7B:
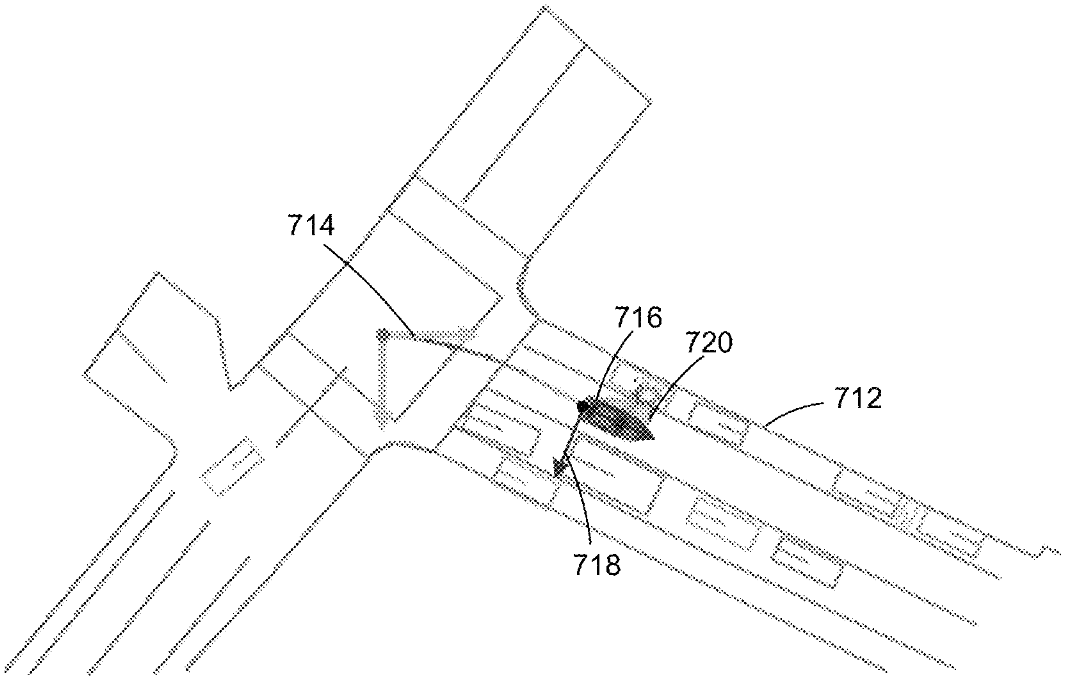

FIGS. 7A-7B illustrates exemplar performance metric evaluations of the BEV-planner model 150 of FIG. 1, according to various embodiments. As shown in FIG. 7A, in some embodiments, the performance evaluation module 608 of the model trainer 116 can evaluate a performance metric, referred to herein as the "collision rate," that counts a number of trajectories generated by the BEV-planner model 150 for the training data 602, and/or other data, that result in collisions with other vehicles, while taking into account the yaw angle of the vehicle in the trajectories, and divides the count by the number of frames for which the count is performed to obtain a rate. For example, the count could be performed for a number of keyframes that is a subset of the total frames. In some embodiments, the yaw angle can be updated based on variations in the trajectory. Accounting for the yaw angle of the vehicle is advantageous, because doing so can avoid false negative collisions that conventional performance metrics may fail to detect, as well as false positive collisions that conventional performance metrics incorrectly detect. Illustratively, the initial yaw angle of a vehicle 702, represented by coordinate frame 704, is updated to a new yaw angle, represented by coordinate frame 708, when the vehicle 702 moves along a trajectory predicted by the BEV-planner model 150. Using the new yaw angle and a bounding box representing the vehicle 702, the performance evaluation module 608 can compute whether the bounding box of the vehicle oriented according to the new yaw angle overlaps the bounding box of another vehicle, meaning that a collision has occurred. By contrast, conventional performance metrics do not update the initial yaw angle, shown as vehicle 710. Instead, conventional performance metrics only consider a series of trajectory points, while assuming that the yaw angle remains unchanged. Illustratively, not updating the initial yaw angle can result in false negatives in which collisions are not detected.

As shown in FIG. 7B, not updating the initial yaw angle can also result in false positives in which incorrect collisions are detected. Illustratively, when the initial yaw angle of a vehicle 716, represented by coordinate frame 714, is not updated to a new yaw angle 718 when the vehicle 716 moves along a trajectory predicted by the BEV-planner model 150, then the vehicle at the original yaw angle 720 can be incorrectly detected as colliding with another vehicle.

As described, in some embodiments, the collision rate is computed by counting the number of trajectories generated by the BEV-planner model 150 that result in collisions with other vehicles, and divided the count by the number of frames for which the count is performed. This is in contrast to conventional collision rate metrics that count the number of time steps at which collisions occur, which can over-count the number of actual collisions in a single trajectory when a single collision is counted as multiple collisions at different time steps of the trajectory. More formally, conventional collision rate metrics define collision rate of each single sample as:

$$CR(t) = \frac{\sum_{i=0}^{N} \mathbb{1}_i}{N},\ N = t/0.5, \tag{2}$$

where N represents the number of steps at intervals of t seconds, and $\mathbb{1}_t$ denotes whether the vehicle at step i will intersect with other agents. By contrast, the performance evaluation module 608 can use the following definition of collision:

$$CR(t) = \left(\sum_{i=0}^{N} \mathbb{1}_i\right) > 0,\ N = t/0.5. \tag{3}$$

Unlike the collision rate of equation (2), which assumes that collisions at each moment are mutually independent, which does not align with real-world scenarios, the collision rate of equation (3) yields values that more precisely indicate the collision rate occurring along a predicted trajectory.

In some embodiments, performance evaluation module 608 can also compute a performance metric, referred to herein as the "curb collision rate," that counts a number of times that trajectories generated by the BEV-planner model 150 collide with a border of a drivable region of an environment, and divides the count by the number of frames for which the count is performed (e.g., a number of key frames) to obtain a rate. For example, in some embodiments, the border of a drivable region, shown as the border of a road 712 in FIG. 7B, can be known from training data, or other data, that is used to evaluate the BEV-planner model 150. In such cases, a collision between the vehicle and a border of the drivable region can be determined to occur when a bounding box of the vehicle goes outside of a segmented area corresponding to the drivable region in a top-down view map of the environment. The segmented area can be represented by pixels for the drivable space, and any intersection between pixels of the bounding box of the vehicle and pixels for the drivable space can be considered as a collision with a border of the drivable region. More specifically, the curb collision rate can calculate the collision rate between predicted trajectories and curbs (road boundaries). Staying on the road is vital for the safety of autonomous vehicles, yet conventional evaluation metrics overlook the integration of map priors. Intuitively, safe trajectories should avoid collision with curbs. The curb collision rate indicates the possibility of leaving the drivable area, which can pose safety hazards. In some embodiments, to facilitate computing collisions between predicted trajectories and curbs, the road boundary can be rasterized using a resolution of, for example, 0.1 meters.

Figure 8:
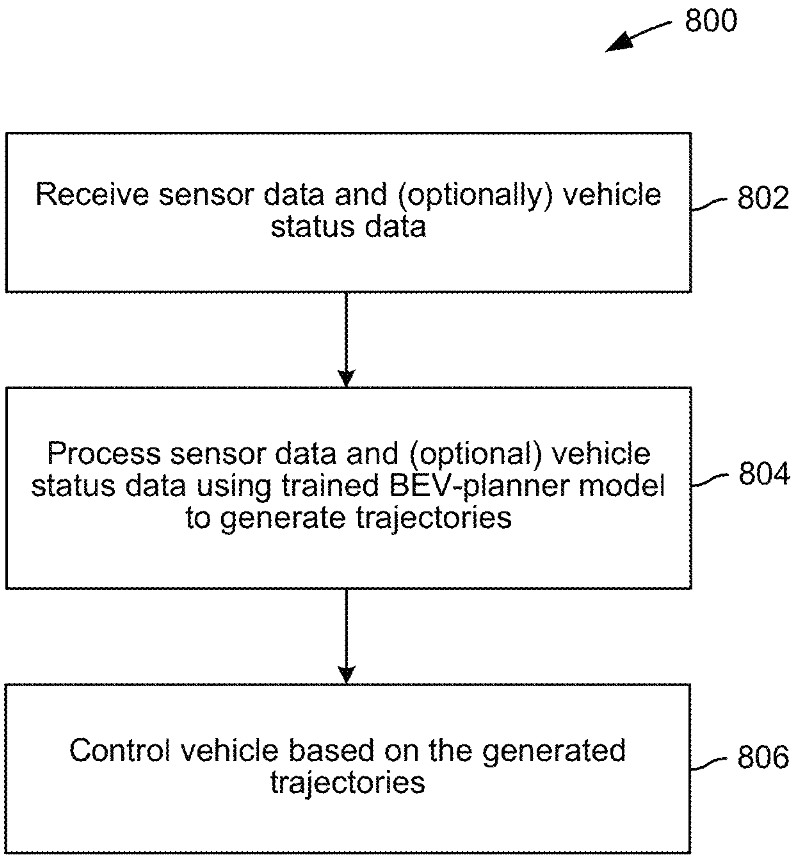
FIG. 8 is a flow diagram of method steps for controlling a vehicle using a trained BEV-planner model, according to various embodiments.

FIG. 8 is a flow diagram of method steps for controlling a vehicle using a trained BEV-planner model, according to various embodiments. Although the method steps are described in conjunction with FIGS. 1-6, persons skilled in the art will understand that any system configured to perform the method steps, in any order, falls within the scope of the present invention.

As shown, a method 800 begins at step 802, where the AV application 146 receives sensor data and (optionally) vehicle status information. Any technically feasible sensor data and vehicle status information can be received in some embodiments. For example, in some embodiments, the sensor data can include image data, LIDAR data, and/or RADAR data. As another example, in some embodiments, the vehicle status information can include CAN bus information, such as a information on the vehicle speed, acceleration, steering angle, braking, location, etc.

At step 804, the AV application 146 processes the sensor data and (optional) vehicle status information using the trained BEV-planner model 150 to generate planned trajectories for a vehicle. Any number and type of trajectories can be generated in some embodiments. For example, in some embodiments, the trajectories can include x, y coordinates for one or more waypoints; x, y, z coordinates for one or more waypoints; or x, y and orientation coordinates for one or more waypoints, which can be input into a controller that generates a control signal for controlling a vehicle. As another example, in some embodiments, the AV application 146 can directly generate a control signal for controlling a vehicle from the trajectories.

At step 806, the AV application 146 controls the vehicle based on the generated trajectories. In some embodiments, the AV application 146 can transmit the planned trajectories to a controller that generates one or more control signals for controlling a vehicle. In some other embodiments, the AV application 146 can directly generate a control signal for controlling a vehicle from the planned trajectories.

Figure 9:
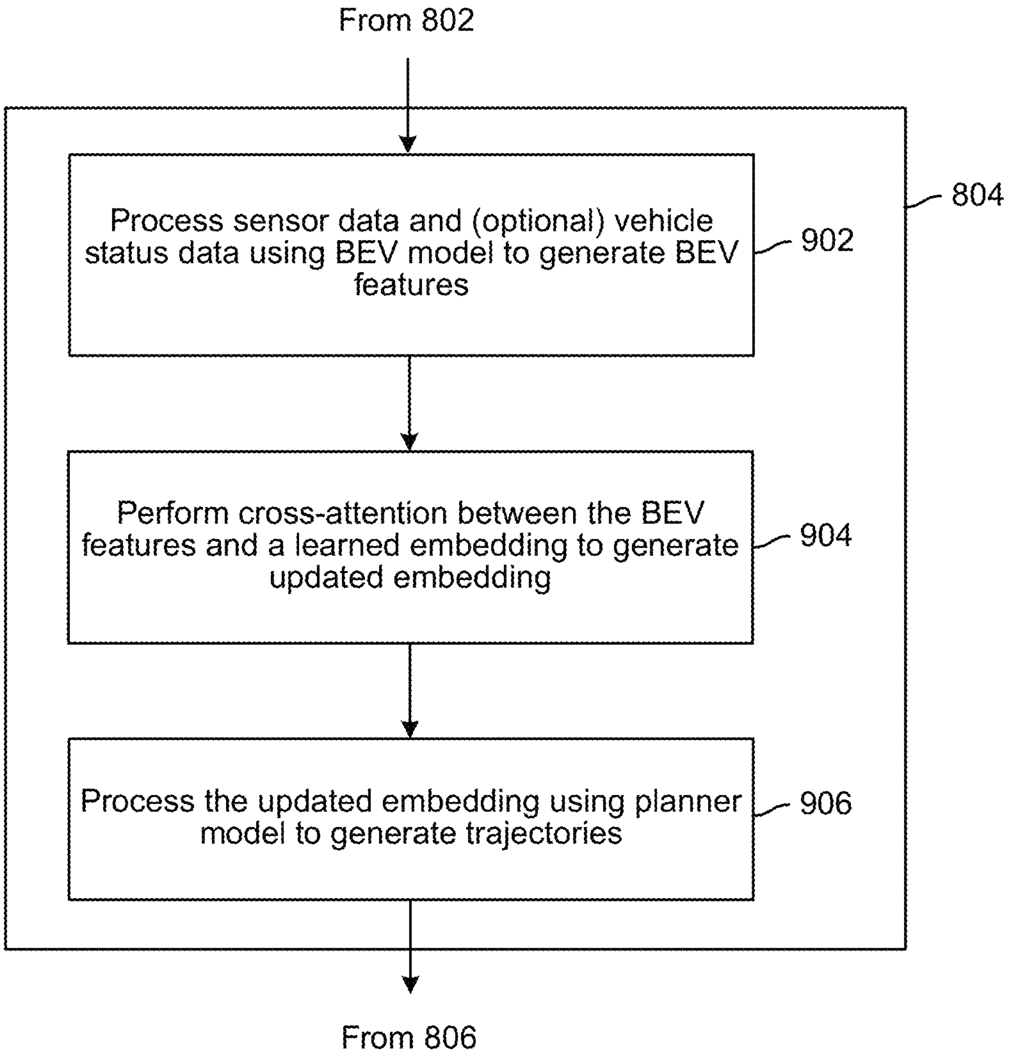
FIG. 9 is a flow diagram of method steps for processing sensor data and, optionally, vehicle status information using a BEV-planner model, according to various embodiments.

FIG. 9 is a flow diagram of method steps for processing sensor data and optionally vehicle status information using a BEV-planner model, according to various embodiments. Although the method steps are described in conjunction with FIGS. 1-6, persons skilled in the art will understand that any system configured to perform the method steps, in any order, falls within the scope of the present invention.

As shown, at step 902, the AV application 146 processes sensor data and (optional) vehicle status information using the BEV model 504 to generate BEV features. In some embodiments, the planner model 514 can be an artificial neural network that is trained to take as input sensor data and optionally vehicle status information, and to output features from a BEV perspective. In some embodiments, the BEV features can also be concatenated with historical BEV features generated during previous time steps, if any.

At step 904, the AV application 146 performs cross-attention between the BEV features (concatenated with historical BEV features) and a learned embedding to generate an updated embedding that is a combination of the BEV features and the learned embedding. In some embodiments, the planner model 514 can be an artificial neural network that includes one or more layers of neurons that performs the cross-attention between the BEV features and the embedding that is learned during training of the BEV-planner model 150, as described above in conjunction with FIGS. 5-6.

At step 906, the AV application 146 processes the updated embedding using the planner model 514 to generate trajectories. In some embodiments, the planner model 514 can be an artificial neural network, such as an MLP, that is trained to take as input the updated embedding and to output one or more trajectories. In some embodiments, the planner model 514 can also optionally take as input vehicle status information.

Figure 10:
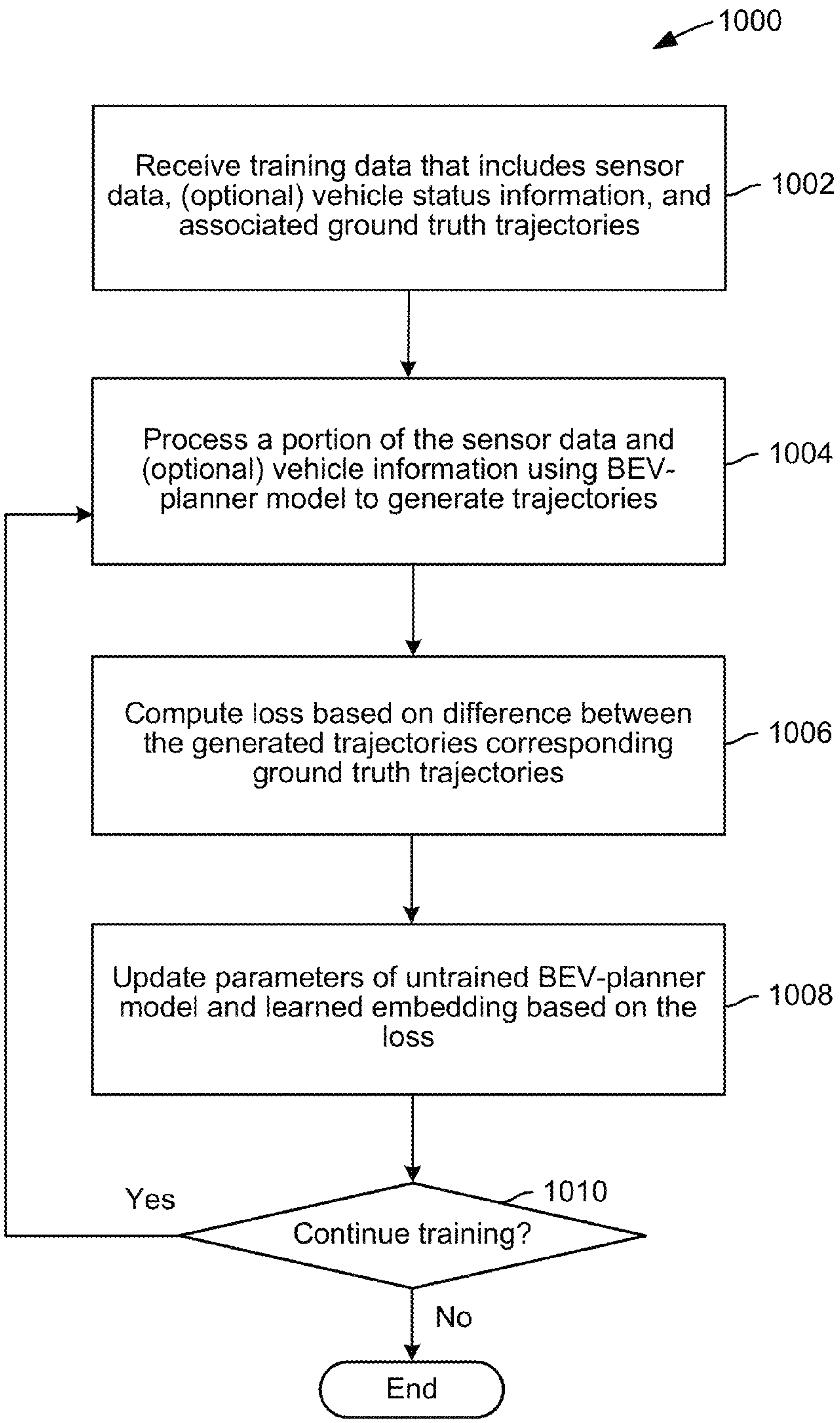
FIG. 10 is a flow diagram of method steps for training a BEV-planner model to control a vehicle, according to various embodiments.

FIG. 10 is a flow diagram of method steps for training a BEV-planner model to control a vehicle, according to various embodiments. Although the method steps are described in conjunction with FIGS. 1-6, persons skilled in the art will understand that any system configured to perform the method steps, in any order, falls within the scope of the present invention.

As shown, a method 1000 begins at step 1002, where the model trainer 116 receives training data that includes sensor data, (optional) vehicle status information, and associated ground truth trajectories. Any technically feasible sensor data (e.g., image data, LIDAR data, and/or RADAR data) and vehicle status information (e.g., CAN bus data) can be received in some embodiments. The ground truth trajectories can be from real-world driving data, which is used in supervised training to teach a BEV-planner model human driving behaviors.

At step 1004, the model trainer 116 processes a portion of the sensor data and (optional) vehicle information using the untrained BEV-planner model 606 to generate trajectories. For example, in some embodiments, the model trainer 116 can input a frame that includes sensor data corresponding to a particular time into the untrained BEV-planner model 606. Given such an input, the untrained BEV-planner model 606 outputs planned trajectories for a vehicle. In some embodiments, only a subset of frames, such as a number of keyframes, are processed using the untrained BEV-planner model 606 during training.

At step 1006, the model trainer 116 computes a loss based on a difference between the generated trajectories and corresponding ground truth trajectories. Any technically feasible loss metric, such as L1 distance or L2 distance, can be used in some embodiments.

At step 1008, the model trainer 116 updates parameters of the BEV-planner model 606 and a learned embedding (e.g., learning embedding 510) based on the loss. In some embodiments, parameters of the BEV-planner model 606 can be updated using backpropagation with gradient descent, or a variation thereof.

At step 1010, if the model trainer 116 determines to continue training, then the method 1000 returns to step 1004, where the model trainer 116 processes another portion of the sensor data and optional vehicle status information from the training data using the BEV-planner model to generate trajectories. For example, in some embodiments, the model trainer 116 can continue training for a fixed number of iterations, until the loss computed at stop 1006 stops improving, or until any other technically feasible termination condition is reached. If the model trainer 116 determines not to continue training at step 1010, then the method 1000 ends.

Figure 11:
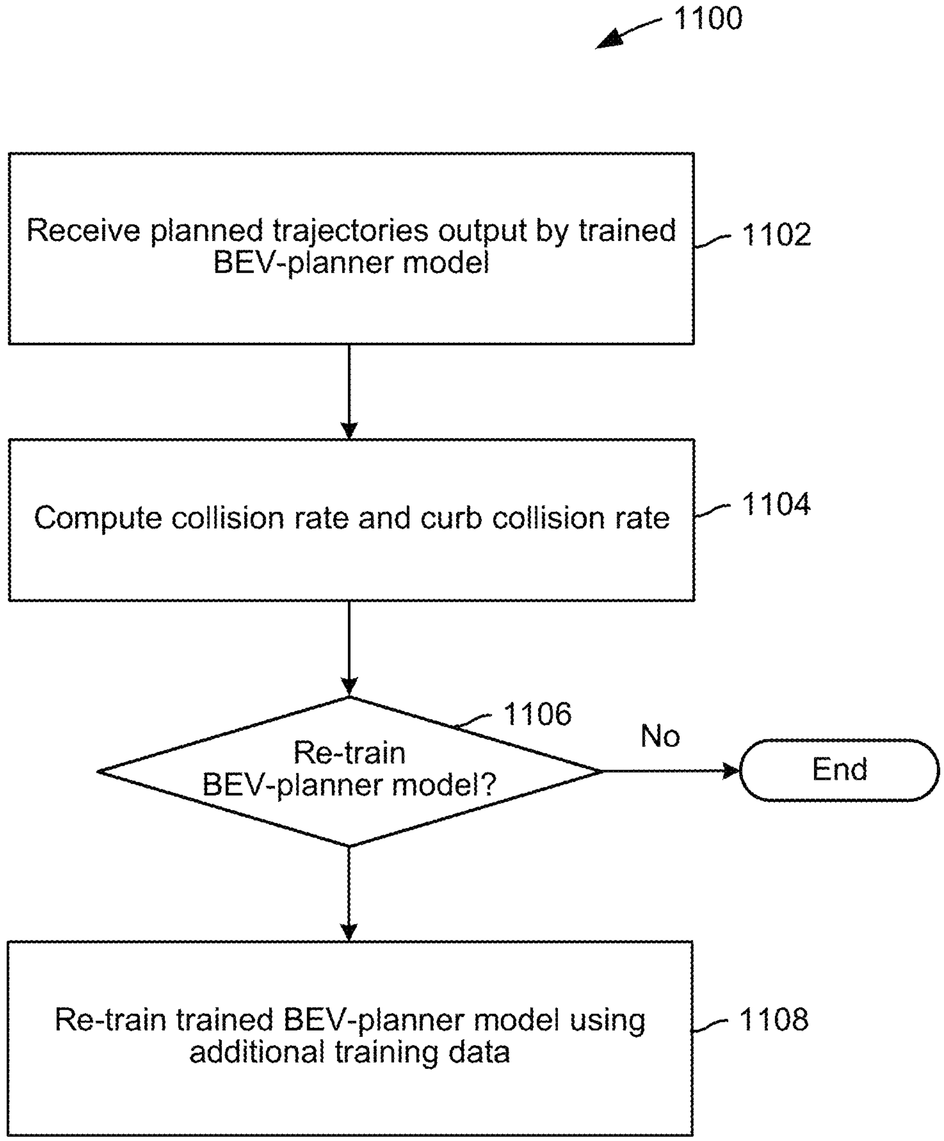
FIG. 11 is a flow diagram of method steps for re-training a BEV-planner model, according to various embodiments.

FIG. 11 is a flow diagram of method steps for re-training a BEV-planner model, according to various embodiments. Although the method steps are described in conjunction with FIGS. 1-6, persons skilled in the art will understand that any system configured to perform the method steps, in any order, falls within the scope of the present invention.

As shown, a method 1100 begins at step 1102, where the model trainer 116 receives planned trajectories output by the trained BEV-planner model 150. The planned trajectories can be generated for any suitable data, such as data used to train the trained BEV-planner model 150 or other available data.

At step 1104, the model trainer 116 computes a collision rate and a curb collision rate. The collision rate counts a number of trajectories generated by the trained BEV-planner model 150 for training data, and/or other data, that result in collisions with other vehicles, while taking into account the yaw angle of the vehicle in the trajectories based on variations in the trajectory, and divides the count by the number of frames for which the count is performed (e.g., a number of keyframes) to obtain a rate. The curb collision rate counts a number of times that trajectories generated by the BEV-planner model 150 collide with a border of a drivable region of an environment, and divides the count by the number of frames for which the count is performed (e.g., a number of keyframes) to obtain a rate. In some embodiments, the collision rate and the curb collision rate can be computed as described above in conjunction with FIGS. 7A-7B.

At step 1106, the model trainer 116 determines whether to re-train the trained BEV-planner model 150. The model trainer 116 can determine to re-train the trained BEV-planner model 150 in any technically feasible manner in some embodiments, such as based on whether the collision rate and/or the curb collision rate exceeds a threshold. Alternatively, in some embodiments, the model trainer 116 can display the collusion rate and the curb collision to a user via a display device and then re-train the trained BEV-planner model 150 in response to a request from the user.

If the model trainer 116 determines to re-train the trained BEV-planner model 150, then the method 1100 continues to step 1108, where the model trainer 116 re-trains the trained BEV-planner model 150 using additional training data. In some embodiments, the model trainer 116 can re-train the trained BEV-planner model 150 according to the method 1000, described above in conjunction with FIG. 10. On the other hand, if the model trainer 116 determines not to re-train the trained BEV-planner model 150, then the method 1100 ends.

In sum, techniques are disclosed for controlling vehicles using BEV-planner models that do not over-rely on vehicle status information. In some embodiments, a BEV-planner model includes a BEV model that converts sensor data and optionally vehicle status information into features from a BEV perspective. An attention module of the BEV-planner model performs cross-attention between the BEV features and a learned embedding to generate an updated embedding. Then, a planner model of the BEV-planner model processes the updated embedding to generate planned trajectories for a vehicle. An AV application can control the vehicle directly using the planned trajectories, or the AV application can transmit the trajectories to a controller that controls the vehicle. In some embodiments, the BEV-planner model can be trained using training data that includes sensor data, optional vehicle status information, and associated ground truth trajectories corresponding to human driving behaviors. In such cases, the training can include updating parameters of the BEV-planner model as well as the embedding that is learned during training. In addition, the trained BEV-planner model can be evaluated using one or more performance metrics that include (1) a rate at which trajectories generated by the BEV-planner model result in collisions with other vehicles that takes into account the yaw angle of the vehicle in the trajectories, and/or (2) a rate at which trajectories generated by the BEV-planner model result in collisions with a border of a drivable region of an environment.

At least one technical advantage of the disclosed techniques relative to the prior art is that the disclosed techniques enable a BEV-planner model to generate planned trajectories for a vehicle using sensor data related to the surrounding environment, without becoming overly reliant on vehicle status information. Accordingly, the disclosed techniques, when implemented to control vehicles, can result in those vehicles being driven in a manner that is safer and more similar to how human drivers drive vehicles than what can typically be achieved using conventional machine learning models. In particular, the disclosed techniques perform better than conventional machine learning models for controlling vehicles when vehicle status information is unavailable. These technical advantages represent one or more technological improvements over prior art approaches.

1. In some embodiments, a computer-implemented method for controlling a vehicle comprises processing sensor data associated with a vehicle using a first trained machine learning model to generate one or more bird's eye view (BEV) features, performing one or more cross-attention operations based on the one or more BEV features and a learned embedding to generate an updated embedding, processing the updated embedding using a second trained machine learning model to generate one or more trajectories, and performing one or more operations to control the vehicle based on the one or more trajectories.

2. The computer-implemented method of clause 1, further comprising concatenating the one or more BEV features with one or more additional BEV features generated during one or more previous time steps to generate one or more concatenated BEV features, wherein performing the one or more cross-attention operations comprises combining the one or more concatenated BEV features with the learned embedding.

3. The computer-implemented method of clauses 1 or 2, wherein the sensor data is processed along with status information associated with the vehicle using the first trained machine learning model to generate the one or more BEV features.

4. The computer-implemented method of any of clauses 1-3, wherein the updated embedding is processed along with status information associated with the vehicle using the second trained machine learning model to generate the one or more trajectories.

5. The computer-implemented method of any of clauses 1-4, wherein the second trained machine learning model comprises a multi-layer perceptron.

6. The computer-implemented method of any of clauses 1-5, wherein the sensor data includes at least one of image data, light detection and ranging (LIDAR) data, or radio detection and ranging (RADAR) data.

7. The computer-implemented method of any of clauses 1-6, further comprising performing one or more training operations to generate the first trained machine learning model, the second trained machine learning model, and the learned embedding.

8. The computer-implemented method of any of clauses 1-7, further comprising determining, based on one or more additional trajectories generated by the second trained machine learning model and one or more yaw angles associated with the one or more additional trajectories, one or more collisions between the vehicle and at least one other vehicle, and either displaying a rate associated with the one or more collisions via a display device or performing one or operations to re-train the first trained machine learning model and the second trained machine learning model based on the rate associated with the one or more collisions to generate a first re-trained machine learning model and a second re-trained machine learning model.

9. The computer-implemented method of any of clauses 1-8, further comprising determining, based on one or more additional trajectories generated by the second trained machine learning model, one or more collisions between the vehicle and at least one other vehicle, wherein each trajectory included in the one or more additional trajectories is associated with at most one collision included in the one or more collisions, and either displaying a rate associated with the one or more collisions via a display device or performing one or operations to re-train the first trained machine learning model and the second trained machine learning model based on the rate associated with the one or more collisions to generate a first re-trained machine learning model and a second re-trained machine learning model.

10. The computer-implemented method of any of clauses 1-9, further comprising determining, based on one or more additional trajectories generated by the second trained machine learning model, one or more collisions between the vehicle and at least one road boundary, and either displaying a rate associated with the one or more collisions via a display device or performing one or operations to re-train the first trained machine learning model and the second trained machine learning model based on the rate associated with the one or more collisions to generate a first re-trained machine learning model and a second re-trained machine learning model.

11. In some embodiments, one or more non-transitory computer-readable media store instructions that, when executed by at least one processor, cause the at least one processor to perform the steps of processing sensor data associated with a vehicle using a first trained machine learning model to generate one or more bird's eye view (BEV) features, performing one or more cross-attention operations based on the one or more BEV features and a learned embedding to generate an updated embedding, processing the updated embedding using a second trained machine learning model to generate one or more trajectories, and performing one or more operations to control the vehicle based on the one or more trajectories.

12. The one or more non-transitory computer-readable media of clause 11, wherein the instructions, when executed by the at least one processor, further cause the at least one processor to perform the step of concatenating the one or more BEV features with one or more additional BEV features generated during one or more previous time steps to generate one or more concatenated BEV features, wherein performing the one or more cross-attention operations comprises combining the one or more concatenated BEV features with the learned embedding.

13. The one or more non-transitory computer-readable media of clauses 11 or 12, wherein status information associated with the vehicle is processed along with at least one of (i) the sensor data using the first trained machine learning model to generate the one or more BEV features, or (ii) the updated embedding using the second trained machine learning model to generate the one or more trajectories.

14. The one or more non-transitory computer-readable media of any of clauses 11-13, wherein the status information includes controller area network (CAN) bus information.

15. The one or more non-transitory computer-readable media of any of clauses 11-14, wherein the second trained machine learning model comprises a multilayer perceptron.

16. The one or more non-transitory computer-readable media of any of clauses 11-15, wherein the instructions, when executed by the at least one processor, further cause the at least one processor to perform the step of performing one or more training operations using additional sensor data and one or more ground truth trajectories from real-world driving data to generate the first trained machine learning model, the second trained machine learning model, and the learned embedding.

17. The one or more non-transitory computer-readable media of any of clauses 11-16, wherein the one or more training operations use an L1 loss function or an L2 loss function.

18. The one or more non-transitory computer-readable media of any of clauses 11-17, wherein the instructions, when executed by the at least one processor, further cause the at least one processor to perform the steps of determining, based on one or more additional trajectories generated by the second trained machine learning model and one or more yaw angles associated with the one or more additional trajectories, one or more collisions between the vehicle at least one other vehicle, wherein each trajectory included in the one or more additional trajectories is associated with at most one collision included in the one or more collisions, and either displaying a rate associated with the one or more collisions via a display device or performing one or operations to re-train the first trained machine learning model and the second trained machine learning model based on the rate associated with the one or more collisions to generate a first re-trained machine learning model and a second re-trained machine learning model 19. The one or more non-transitory computer-readable media of any of clauses 11-18, wherein the instructions, when executed by the at least one processor, further cause the at least one processor to perform the steps of determining, based on one or more additional trajectories generated by the second trained machine learning model, one or more collisions between the vehicle and at least one road boundary, and either displaying a rate associated with the one or more collisions via a display device or performing one or operations to re-train the first trained machine learning model and the second trained machine learning model based on the rate associated with the one or more collisions to generate a first re-trained machine learning model and a second re-trained machine learning model.

20. In some embodiments, a system comprises one or more memories storing instructions, and one or more processors that are coupled to the one or more memories and, when executing the instructions, are configured to process sensor data associated with a vehicle using a first trained machine learning model to generate one or more bird's eye view (BEV) features, perform one or more cross-attention operations based on the one or more BEV features and a learned embedding to generate an updated embedding, process the updated embedding using a second trained machine learning model to generate one or more trajectories, and performing one or more operations to control the vehicle based on the one or more trajectories.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling a vehicle, the method comprising:

processing sensor data associated with a vehicle using a first trained machine learning model to generate one or more bird's eye view (BEV) features;

performing one or more cross-attention operations based on the one or more BEV features and a learned embedding to generate an updated embedding;

processing the updated embedding using a second trained machine learning model to generate one or more trajectories; and performing one or more operations to control the vehicle based on the one or more trajectories.

2. The computer-implemented method of claim 1, further comprising concatenating the one or more BEV features with one or more additional BEV features generated during one or more previous time steps to generate one or more concatenated BEV features, wherein performing the one or more cross-attention operations comprises combining the one or more concatenated BEV features with the learned embedding.

3. The computer-implemented method of claim 1, wherein the sensor data is processed along with status information associated with the vehicle using the first trained machine learning model to generate the one or more BEV features.

4. The computer-implemented method of claim 1, wherein the updated embedding is processed along with status information associated with the vehicle using the second trained machine learning model to generate the one or more trajectories.

5. The computer-implemented method of claim 1, wherein the second trained machine learning model comprises a multi-layer perceptron.

6. The computer-implemented method of claim 1, wherein the sensor data includes at least one of image data, light detection and ranging (LIDAR) data, or radio detection and ranging (RADAR) data.

7. The computer-implemented method of claim 1, further comprising performing one or more training operations to generate the first trained machine learning model, the second trained machine learning model, and the learned embedding.

8. The computer-implemented method of claim 1, further comprising:

determining, based on one or more additional trajectories generated by the second trained machine learning model and one or more yaw angles associated with the one or more additional trajectories, one or more collisions between the vehicle and at least one other vehicle; and either displaying a rate associated with the one or more collisions via a display device or performing one or operations to re-train the first trained machine learning model and the second trained machine learning model based on the rate associated with the one or more collisions to generate a first re-trained machine learning model and a second re-trained machine learning model.

9. The computer-implemented method of claim 1, further comprising:

determining, based on one or more additional trajectories generated by the second trained machine learning model, one or more collisions between the vehicle and at least one other vehicle, wherein each trajectory included in the one or more additional trajectories is associated with at most one collision included in the one or more collisions; and either displaying a rate associated with the one or more collisions via a display device or performing one or operations to re-train the first trained machine learning model and the second trained machine learning model based on the rate associated with the one or more collisions to generate a first re-trained machine learning model and a second re-trained machine learning model.

10. The computer-implemented method of claim 1, further comprising:

determining, based on one or more additional trajectories generated by the second trained machine learning model, one or more collisions between the vehicle and at least one road boundary; and either displaying a rate associated with the one or more collisions via a display device or performing one or operations to re-train the first trained machine learning model and the second trained machine learning model based on the rate associated with the one or more collisions to generate a first re-trained machine learning model and a second re-trained machine learning model.

11. One or more non-transitory computer-readable media storing instructions that, when executed by at least one processor, cause the at least one processor to perform the steps of:

processing sensor data associated with a vehicle using a first trained machine learning model to generate one or more bird's eye view (BEV) features;

performing one or more cross-attention operations based on the one or more BEV features and a learned embedding to generate an updated embedding;

processing the updated embedding using a second trained machine learning model to generate one or more trajectories; and performing one or more operations to control the vehicle based on the one or more trajectories.

12. The one or more non-transitory computer-readable media of claim 11, wherein the instructions, when executed by the at least one processor, further cause the at least one processor to perform the step of concatenating the one or more BEV features with one or more additional BEV features generated during one or more previous time steps to generate one or more concatenated BEV features, wherein performing the one or more cross-attention operations comprises combining the one or more concatenated BEV features with the learned embedding.

13. The one or more non-transitory computer-readable media of claim 11, wherein status information associated with the vehicle is processed along with at least one of (i) the sensor data using the first trained machine learning model to generate the one or more BEV features, or (ii) the updated embedding using the second trained machine learning model to generate the one or more trajectories.

14. The one or more non-transitory computer-readable media of claim 13, wherein the status information includes controller area network (CAN) bus information.

15. The one or more non-transitory computer-readable media of claim 11, wherein the second trained machine learning model comprises a multi-layer perceptron.

16. The one or more non-transitory computer-readable media of claim 11, wherein the instructions, when executed by the at least one processor, further cause the at least one processor to perform the step of performing one or more training operations using additional sensor data and one or more ground truth trajectories from real-world driving data to generate the first trained machine learning model, the second trained machine learning model, and the learned embedding.

17. The one or more non-transitory computer-readable media of claim 16, wherein the one or more training operations use an L1 loss function or an L2 loss function.

18. The one or more non-transitory computer-readable media of claim 11, wherein the instructions, when executed by the at least one processor, further cause the at least one processor to perform the steps of:

determining, based on one or more additional trajectories generated by the second trained machine learning model and one or more yaw angles associated with the one or more additional trajectories, one or more collisions between the vehicle at least one other vehicle, wherein each trajectory included in the one or more additional trajectories is associated with at most one collision included in the one or more collisions; and either displaying a rate associated with the one or more collisions via a display device or performing one or operations to re-train the first trained machine learning model and the second trained machine learning model based on the rate associated with the one or more collisions to generate a first re-trained machine learning model and a second re-trained machine learning model.

19. The one or more non-transitory computer-readable media of claim 11, wherein the instructions, when executed by the at least one processor, further cause the at least one processor to perform the steps of:

determining, based on one or more additional trajectories generated by the second trained machine learning model, one or more collisions between the vehicle and at least one road boundary; and either displaying a rate associated with the one or more collisions via a display device or performing one or operations to re-train the first trained machine learning model and the second trained machine learning model based on the rate associated with the one or more collisions to generate a first re-trained machine learning model and a second re-trained machine learning model.

20. A system, comprising:

one or more memories storing instructions; and one or more processors that are coupled to the one or more memories and, when executing the instructions, are configured to:

process sensor data associated with a vehicle using a first trained machine learning model to generate one or more bird's eye view (BEV) features, perform one or more cross-attention operations based on the one or more BEV features and a learned embedding to generate an updated embedding, process the updated embedding using a second trained machine learning model to generate one or more trajectories, and performing one or more operations to control the vehicle based on the one or more trajectories.

* * * * *